United States Patent [19]

Taniguchi et al.

[11] Patent Number: 4,537,487
[45] Date of Patent: Aug. 27, 1985

[54] AUTOMATIC FOCUS CONTROL SYSTEM WITH BACKLASH CORRECTING ARRANGEMENT

[75] Inventors: Nobuyuki Taniguchi, Tondabayashi; Norio Ishikawa; Takeshi Egawa, both of Osaka, all of Japan

[73] Assignee: Minolta Camera Kabushiki Kaisha, Osaka, Japan

[21] Appl. No.: 646,380

[22] Filed: Aug. 29, 1984

[30] Foreign Application Priority Data

Sep. 1, 1983 [JP] Japan .................... 58-161393
Nov. 4, 1983 [JP] Japan .................... 58-207758
Jul. 2, 1984 [JP] Japan .................... 59-137570

[51] Int. Cl.³ .................... G03B 3/10
[52] U.S. Cl. .................... 354/400; 354/286
[58] Field of Search .................... 354/400–409, 354/286, 289.12, 195.1

[56] References Cited

U.S. PATENT DOCUMENTS

| | | | |
|---|---|---|---|
| 4,182,563 | 1/1980 | Biber et al. | 354/401 |
| 4,322,151 | 3/1982 | Weiss | 354/195.1 |
| 4,348,089 | 9/1982 | Shenk | 354/401 |
| 4,470,683 | 9/1984 | Nakajima | 354/406 |
| 4,472,040 | 9/1984 | Kawabata | 354/406 |
| 4,477,164 | 10/1984 | Nakai et al. | 354/286 |
| 4,477,167 | 10/1984 | Ishikawa et al. | 354/400 |
| 4,483,603 | 11/1984 | Metabl et al. | 354/402 |

Primary Examiner—William B. Perkey
Attorney, Agent, or Firm—Joseph W. Price

[57] ABSTRACT

An automatic focus control system provided with a backlash correcting arrangement, which is free from influences arising from a backlash or play in a transmission system, and capable of quickly effecting the automatic focus control at a high accuracy.

10 Claims, 20 Drawing Figures

AUTOMATIC FOCUS CONTROL SYSTEM WITH BACKLASH CORRECTING ARRANGEMENT

BACKGROUND OF THE INVENTION

The present invention generally relates to an automatic focus control system with a backlash correcting arrangement for a photographic camera and more particularly, to an automatic focus control system which is so arranged that, by detecting, through photoelectric measurements, electrical calculating processing, etc., an amount of deviation in the position of an image of a target object formed by an objective lens with respect to a focal plane, i.e, the so-called amount of deviation in the focusing, a driving amount of a motor for driving a focusing optical system (i.e., optical system to be displaced for the focus control) of the objective lens is calculated so as to control the driving motor based on the result of the calculation for the focus control of the objective lens.

Up to the present, there has been proposed by the present inventors, for example, in Japanese Laid-Open Patent Application (Tokkaisho) No. 57-93326, an automatic focus control system in which distribution of light intensity or incident light amount of a target object light transmitted through an objective lens on a predetermined focal plane is photoelectrically detected so as to obtain data of a deviation amount of an image of the target object formed by the objective lens with respect to the predetermined focal plane, by subjecting the result of the detection to a predetermined calculation processing for driving a driving motor based on the above data, whereby a focusing optical system of the objective lens is driven through a driving mechanism coupled to the driving motor for effecting the focus control.

In the known arrangement as described above, within a mechanical transmission system ranging from the driving motor to the focusing optical system, there is a backlash or play between elements such as gears, connecting members, etc. related to the transmission, and it is impossible to completely eliminate such backlash or play in the arrangement. In the case where the focus control is effected through the transmission system as described above, there is no problem if the focusing optical system reaches an in-focus position while the driving motor is rotating in one direction and the driving of the motor is stopped thereat, but when the focusing optical system is subjected to reciprocating movements before arrival at the in-focus position, for example, in the case where the focusing optical system has undesirably passed through the in-focus position by some causes and it is required to return the focusing optical system by reversing the driving motor, an error equivalent to the backlash is produced during the reversing of the driving direction. More specifically, in the above case, with respect to a certain rotational amount of the driving motor, the focusing optical system is to be driven less than a predetermined driving amount by the backlash amount. As a result, in the case where the focusing optical system is caused to arrive at the in-focus position by repeating the focus detection (i.e., detection of an amount of deviation in the position of an image of the target object to be photographed with respect to the predetermined focal plane), while moving the focusing optical system of the objective lens, there may be such inconveniences that the focusing optical system repeats reciprocating movements in the vicinity of the in-focus position or it takes a long time for the optical system to reach the in-focus position. Meanwhile, in such a case where the focus detection is effected, with the focusing optical system remaining stationary, and based on the result of the above focus detection, the focusing optical system is moved up to a position in the vicinity of the in-focus position for a rough adjustment, and subsequently, another focus detection is effected again so as to effect a fine adjustment of the position of the focusing optical system based on said another focus detection, an error is produced in the amount of adjustment during the fine adjustment if the driving direction of the focusing optical system is altered between the rough adjustment and the fine adjustment. Moreover, also in the case where the focusing control is effected based on the focus detection of only one time, when the focusing is effected with respect to another target object after one target object has been brought into focus, an error is produced in a second adjusting amount, if the moving direction of the focusing optical system is changed.

SUMMARY OF THE INVENTION

Accordingly, an essential object of the present invention is to provide an automatic focus control system with a backlash correction arrangement, which is free from influences due to the backlash or play in the transmission system as described above, and capable of quickly effecting the automatic focus control at a high accuracy.

In accomplishing the above object according to one feature of the present invention, it is so arranged that data equivalent in amount to an error resulting from the backlash is prepared in data outputting means, and upon alteration of a driving direction for a driving motor or focusing optical system, data of a driving amount of the driving motor is subjected to a correction by the data equivalent in amount to the error, and also that said data output means may be preferably provided within each interchangeable lens, since the backlash amount is different for each lens to be exchanged in a photographic camera of a lens interchanging type.

Incidentally, in the case where the data output means related to the backlash is to be provided within the interchangeable lens according to the present invention, upon consideration of outputting said data in digital form at a required accuracy, the number of bits for digital values representing said data may be increased, thus resulting in an increased capacity of a ROM (read only memory) within the interchangeable lens for storing said data.

Therefore, another object of the present invention is to provide an automatic focus control system of the above described type, in which, in the case where means for outputting data related to the backlash is provided in an interchangeable lens, it is so arranged that said data may be output at a high accuracy, with a less information capacity.

According to another feature of the present invention, arrangement is so made that data related to the backlash is shared by a means for outputting data related to a partial backlash associated with a transmission mechanism at the interchangeable lens side, i.e., transmission mechanism ranging from a coupling mechanism which receives a driving force from the camera side to the focusing optical system, and another means for outputting another partial backlash data related to the remaining backlash in the backlash for the entire transmission system from the driving motor to the focusing optical system, while the former output means is provided at the interchangeable lens side, with the latter output means being disposed at the side of the camera main body, thereby to accomplish the second mentioned object as described earlier.

According to a further feature of the present invention, it is so arranged that, in the data output means provided at each of the various interchangeable lenses, there is stored data indicating only a deviation of the backlash amount associated with the transmission mechanism at the interchangeable lens side in each interchangeable lens from that in a particular standard interchangeable lens, whereby a constant data equivalent to a difference between the whole backlash amount and the above deviation can be produced from the output means at the side of the camera main body with the information capacity of the data output means in each of the interchangeable lenses reduced without losing the accuracy of the whole information.

Based on the above features, in the present invention, upon mounting of an interchangeable lens on the camera main body, based on the data related to the backlash fed from the output means at the side of the interchangeable lens, the backlash amount of the entire system is obtained at the camera main body side. Thus, upon changing of the driving direction of the motor, the driving amount of the lens is corrected by the backlash amount for the entire system.

BRIEF DESCRIPTION OF THE DRAWINGS

These and other objects and features of the present invention will become apparent from the following description taken in conjunction with the preferred embodiments thereof with reference to the accompanying drawings; in which.

DETAILED DESCRIPTION OF THE INVENTION

Figure 1:
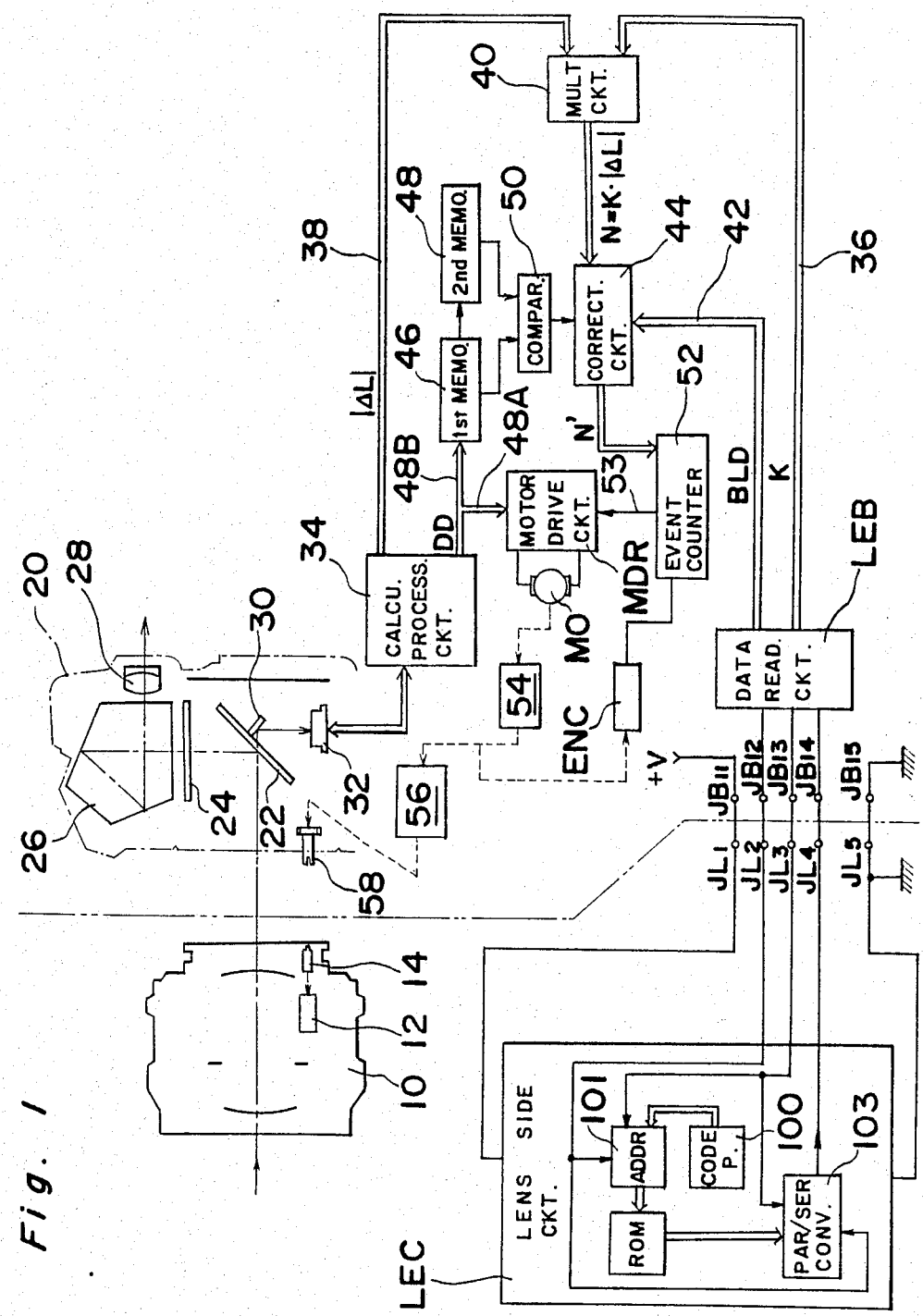
FIG. 1 is a block diagram showing a general construction of an automatic focus control system according to one preferred embodiment of the present invention.

Before the description of the present invention proceeds, it is to be noted that like parts are designated by like reference numerals throughout the accompanying drawings.

Referring now to the drawings, there is shown in FIG. 1 a block diagram showing a general construction of an automatic focus control system according to one preferred embodiment of the present invention, in which the construction of an interchangeable objective lens is shown at the left side of a two-dotted chain line, while the construction of a camera main body is illustrated at the right side of the two-dotted chain line. A specific construction of a connecting portion in a transmission mechanism employed in the arrangement of FIG. 1 is illustrated in FIGS. 2(A) to 2(C).

In FIG. 1, the objective lens 10 is provided with an objective lens optical system and a diaphragm aperture mechanism, and also with a transmission mechanism 12 which transmits, through a lens side connecting member 14, a driving force from the camera side to a focusing optical system to be displaced for the focus control (i.e., an entire optical system of an objective lens in the case of a whole system shifting type as in an ordinary short focal length lens, or a movable lens group in the case of a telephoto lens of an internal focus or rear focus type) in the objective lens optical system. Moreover, within the objective lens 10, there is provided a lens side circuit LEC including a memory circuit ROM in which data for exposure control and automatic focus control inherent in the objective lens such as the maximum diaphragm aperture value, minimum diaphragm aperture value, focal length, factor for converting the defocus amount data detected within the camera main body into the lens driving amount, etc. are stored. Furthermore, in the above memory circuit ROM, there is also stored the backlash data according to the present invention, i.e., data for correction of the error in driving amount produced at the reversing of the driving direction of the driving motor, due to the backlash in the driving force transmission mechanism ranging from the driving motor within the camera to the focusing optical system of the objective lens.

Further provided in the circuit arrangement of FIG. 1 is a circuit LEB for reading off the data from a lens side circuit LEC. Power is fed from a power line +V to the lens side circuit LEC through terminals JB11, JL1, JL5 and JB15. Thus, when terminal JB12 of the circuit LEB become "high" and this state is transmitted through terminal JL2 to circuit means 101 and 103, to be mentioned later, in the circuit LEC, said circuit LEC is brought into an operative state under the power supply. The lens side circuit LEC referred to above includes, in addition to the above mentioned memory circuit ROM in which the exposure control data and an automatic focus control data inherent in this interchangeable lens are fixedly stored in a plurality of addresses, respectively, an addressing means 101 for addressing the addresses of said ROM, and a parallel/serial conversion means 103 for controlling the data transmission between the lens side circuit LEC and the camera body. The above memory circuit ROM is subjected to the addressing by the addressing means 101 which sequentially effects the addressing based on count values by clock pulses applied through the terminals JB13 and JL3. Moreover, in the case where the lens mounted is a zoom lens, the memory circuit ROM is addressed by the addressing means 101 based on an output of a code plate 100 corresponding to the set focal length and count values based on clock pulses from terminal JL3. Meanwhile, the data parallelly produced from the memory circuit ROM is output by the parallel/serial conversion means 103, sequentially one bit by one bit, through the terminals JL4 and JB14, based on the clock pulses input via terminals JB13 and JL3.

The data fixedly stored in the memory circuit ROM includes such data as check data commonly provided for all interchangeable lenses to ensure the proper mounting of the interchangeable lens, data for fully-open diaphragm aperture values, data for maximum diaphragm aperture values, data for errors in the exposure measurement at open aperture, data for focal lengths, data for variations in effective F number corresponding to a set focal distance in a zoom lens, etc. Further included therein are a conversion factor KD for converting the defocus amount calculated in accordance with the focus detecting device into a driving amount of the lens, and data IRD for correcting a deviation in the infocus position detected under near infrared rays from that under ambient light. The near infrared rays is selected as a supplementary light, which is necessary when the ambient light is insufficient for focus detection, so as to protect a person as a target object from being dazzled during a supplementary light emission. The memory circuit further includes data related to a rotational amount of a motor MO from the reversion of its rotation till the lens actually starts the reverse moving when the lens driving direction is changed from one direction to another, i.e., the data related to the backlash.

From the terminal JB13 of the circuit LEB, a train of eight clock pulses is periodically produced. In response to every train of the eight clock pulses, at the lens side circuit LEC, the address of the memory circuit ROM to be designated by the addressing means 101 is successively renewed, while the data fixedly stored in the designated address is serially produced to the terminal JL4 successively in synchronization with each pulse of the eight pulses also applied to the parallel/serial converting means 103, and is successively read serially into the circuit LEB through the terminal JB14.

On the other hand, the camera main body 20 constituted as a single lens reflex camera includes a pentagonal prism 26, a focusing plate 24, a movable reflecting mirror 22, an eye piece 28, an auxiliary mirror 30, a photoelectric element array 32 for the focus detection, a calculation processing circuit 34, a multiplication circuit 40, a correction circuit 44, an event counter 52, a motor driving circuit MDR for driving a motor MO, a comparison circuit 50, a first memory circuit 46 and a second memory circuit 48, a slip mechanism 54, a camera side transmission mechanism 56, a camera side connecting member 58, etc.

More specifically, in the above camera body 20, light from a target object to be photographed transmitted through an optical system of the objective lens 10 is reflected by the movable reflecting mirror 22 so as to form an image of the target object on the focusing plate 24, with the image being observed by a photographer through the pentagonal prism 26 and the eye piece 28. Meanwhile, the movable reflecting mirror 22 is adapted to be semi-transparent at its central portion, and the light transmitted through said semi-transparent portion is reflected by the auxiliary mirror 30 so as to be incident upon the photoelectric element array 32 for the focus detection provided at an inner bottom portion of the camera body 20. The output from this photoelectric element array 32 is fed to the calculation processing circuit 34 connected thereto. This calculation processing circuit 34 subjects the output of the photoelectric element array 32 to a predetermined calculation processing so as to compute the amount of deviation of the position of the target object image formed by the objective lens optical system, with respect to the predetermined focal plane, i.e., the defocus amount, and also to calculate whether the deviation is forward or rearward with respect to the predetermined focal plane or such deviation is not present at all, i.e., the defocus direction related to the front focus, rear focus or in-focus.

Of the objective lens data read by the data reading circuit LEB, the data K for the conversion factor is fed, through a signal line 36, to the multiplication circuit 40, which multiplies the data of defocus amount $|\Delta L|$ fed from the calculation processing circuit 34 through a signal line 38 by the data K for the conversion factor so as to calculate data for a driving amount $N (=K \cdot |\Delta L|)$ of a driving motor MO necessary for moving the focusing optical system until the target object image is formed on the predetermined focal plane (i.e., until the in-focus state is achieved). Meanwhile, the backlash correction amount data BLD read by the data reading circuit LEB is fed to the correction circuit 44 through a signal line 42.

The defocus direction data DD from the calculation processing circuit 34 is applied to the motor driving circuit MDR through a signal line 48A and also, to the first memory circuit 46 through a signal line 48B. Upon receipt of a fresh defocus direction data DD, the first memory circuit 46 transfers the data stored therein up to that time, into the second memory circuit 48, and stores the fresh data. In other words, of the defocus direction data intermittently produced from the calculation processing circuit 34, the latest one is stored in the first memory circuit 46, while the data before the latest one is stored in the second memory circuit 48. It is to be noted here that, in the case where the defocus direction data is of the in-focus (with the amount of deviation at zero), both of the memory circuits maintain the contents up to that time.

The comparison circuit 50 compares the contents of the first and second memory circuits 46 and 48, and applies an output corresponding to the result of comparison to the correction circuit 44 to control the function of said circuit 44. More specifically, when the contents of both of the memory circuits 46 and 48 are equal to each other, i.e., when there is no change in the driving direction of the driving motor MO, the correction circuit 44 produces the output of the multiplication circuit 40 as it is, while on the contrary, when the contents of both of the memory circuits are different from each other, i.e., when the driving direction of the driving motor MO is reversed, the correction circuit 44 produces data $N' (=N+BLD)$ in which the backlash correction amount data BLD from the data reading circuit LEB is added to the output data from the multiplication circuit 40.

The driving force of the motor MO for the focus control is transmitted to the focusing optical system through the slip mechanism 54, camera side transmission mechanism 56, camera side connecting member 58, lens side connecting member 14 and lens side transmission mechanism 12. The slip mechanism 54 has for its object to prevent a load from affecting the driving motor MO when a large load is applied to the transmission mechanism, for example, in the case where the focusing optical system is stopped at an infinite distance in-focus position or minimum distance in-focus position, etc., and is arranged to slip if a load more than a predetermined level is applied to the output side. With respect to a proper portion at a later stage (output side) than the slip mechanism 54, i.e., a portion in a predetermined relation with the actual movement of the focusing optical system, an encoder ENC is connected for an associated function therewith, and adapted to produce pulses corresponding in number to the amount of shift of the focusing optical system. It is to be noted here that the output of each of the multiplication circuit 40 and correction circuit 44 is adapted to become a data in the same unit or dimension as the output of the encoder ENC, with the output of the correction circuit 44 being set in the event counter 52. In response to the defocus direction data DD from the calculation processing circuit 34, the motor driving circuit MDR drives the driving motor MO, and the encoder ENC produces pulses corresponding to the rotation of the motor MO, while the event counter 52 subjects the data preliminarily set therein to decrement according to the pulse input from the encoder ENC, and when the contents thereof become zero, applies a motor stopping signal to the motor driving circuit MDR through a signal line 53 so as to stop the driving motor MO.

Referring also to FIGS. 2(A) to 2(C), there is shown a specific example of the connecting mechanism for connecting the camera side transmission mechanism 56 with the lens side transmission mechanism 12. The lens side connecting member 14 is disposed in a connecting hole formed in a contact face 16 at a rear end of the objective lens barrel. The camera side connecting member 58 is mounted on a forward end of a driving shaft 62 provided in the camera main body 20, and is urged by a coil spring 66 acting on a pivotal lever 64 associated therewith so as to be projected outwardly from a bayonet seat plate 68 of the camera main body 20. The objective lens 10 is adapted to be mounted on the camera main body 20 through the bayonet mount, and during the mounting, the contact face 16 of the objective lens 10 is first brought into contact with the bayonet seat plate 68 of the camera main body 20 for depressing a positioning pin 70 into the seat plate 68 against the coil spring 66, so that the camera side contacting member 58 is retracted. Subsequently, when the objective lens 10 is rotated through a predetermined degree in a predetermined direction with respect to the camera main body 20, the camera side connecting member 58 confronts the connecting hole formed in the contact face 16 of the objective lens 10, while the positioning pin 70 faces a positioning hole 72 at the lens side so as to be respectively fitted into these corresponding holes by the urging force of the coil spring 66, and thus, the camera side connecting member 58 engages the lens side connecting member 14. It is to be noted here that, although there may be a case where these connecting members 58 and 14 are not properly meshed with each other depending on a relative angular relation thereof, they will be brought into a positional relation in which both connecting members are engaged with each other by the time the camera side connecting member 58 is driven through gears 74 and 76 and the driving shaft 62 and completes half a rotation at most.

It should also be noted here that, as shown in FIGS. 2(B) and 2(C), the camera side connecting member 58 has a projection 58a formed at its forward end for engagement with a corresponding recess 14a provided at an end portion of the lens side connecting member 14 so as to provide the meshing portions therebetween, and that at such meshing portions, a side play $\alpha$ must be provided for smooth coupling between the members 58 and 14 as shown in FIG. 2(C), and the amount of backlash resulting from such side play $\alpha$ becomes the main cause of the backlash in the transmission system ranging from the driving motor MO to the focusing optical system. As will be analyzed later, of course, there are additional factors to cause the backlash, such as in the mechanism from the motor Mo to the connecting member 58 and that from the connecting member 14 to the focusing lens.

Figure 3:
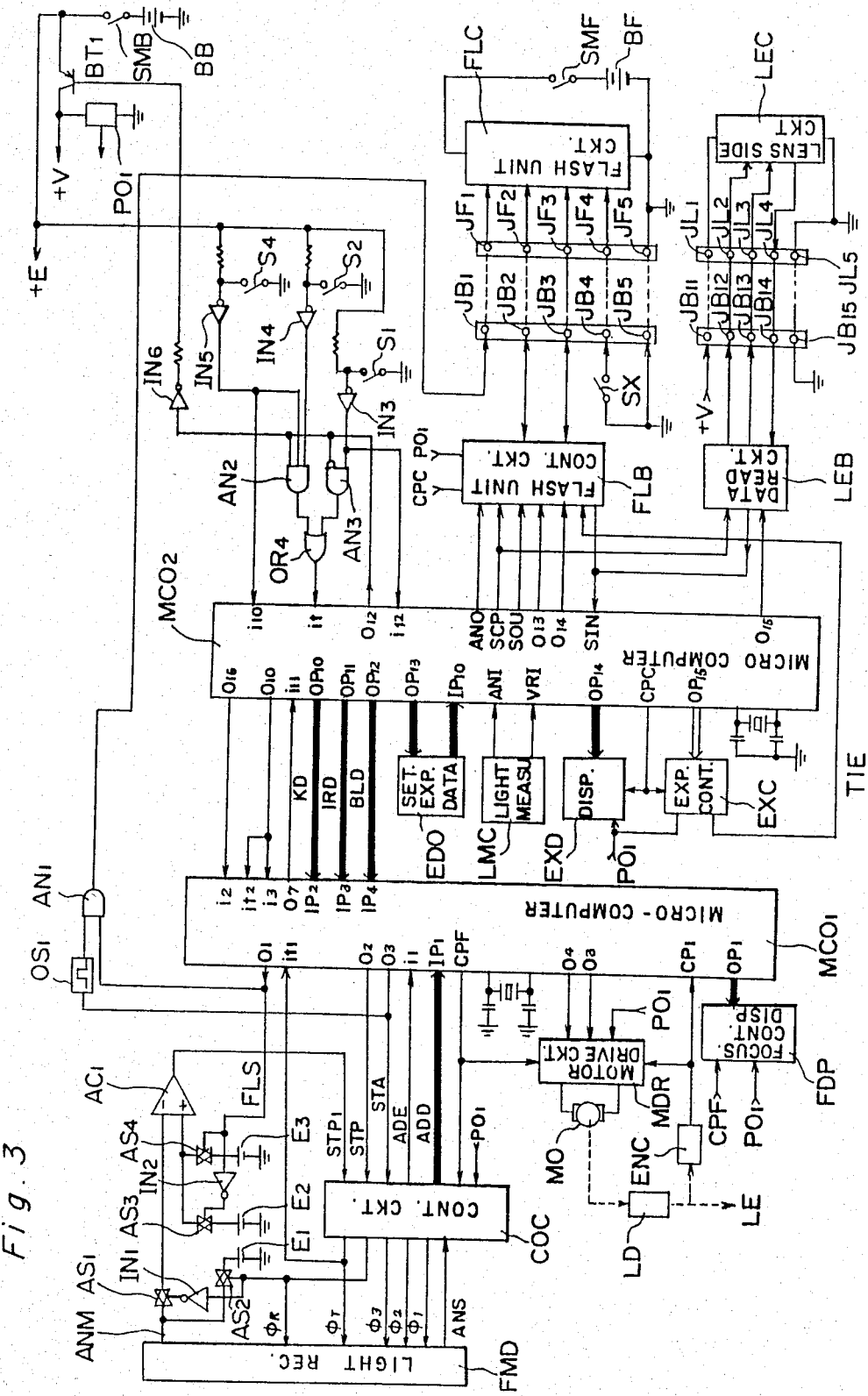
FIG. 3 is an electrical circuit diagram showing an entire camera system to which the present invention has been applied.

In FIG. 3, there is shown in FIG. 1 a circuit diagram representing an entire camera system employing a flash light device or electronic flash unit to which the present invention has been applied. The camera system of FIG. 3 generally includes a light receiving portion FMD, a control circuit COC for controlling the functioning of the light receiving portion FMD, a micro-computer MCO1 for automatic focusing control, another micro-computer MCO2 for controlling functionings of the camera, an electronic flash unit control circuit FLB, and an electronic flash unit circuit FLC, etc. coupled to each other by signal lines as shown, in which thick lines represent signal lines for a plurality of bits. The light receiving portion FMD is composed of a CCD (charge coupled device) and includes two rows of light receiving sections (not particularly shown), each of which is arranged to receive a visible light containing near infrared rays, in a target object light from an exit pupil of an objective lens. Since various arrangements have conventionally been proposed for optical systems, etc. of the light receiving portion, detailed description thereof is omitted here for brevity. The control circuit COC connected to the light receiving portion FMD is further coupled to the automatic focus control microcomputer MCO1 and the camera functioning control microcomputer MCO2 as illustrated.

In the first place, light measuring functions by the circuit portions as described so far will be explained hereinafter.

When a terminal O3 of the micro-computer MCO1 becomes "high", pulses of "high" state are produced from a terminal $\phi R$ of the control circuit COC, and an analog switch AS2 connected between a terminal ANM of the light receiving portion FMD and a constant voltage source E1 is conducted so as to charge a plurality of charge accumulating portions (not particularly shown) of the CCD (FMD) up to an output voltage of the constant voltage source E1 through the terminal ANM. Thus, when the terminal $\phi R$ goes "low", charges corresponding to light receiving amount at each of the light receiving sections are successively accumulated in said charge accumulating portions. In this case, signal corresponding to the accumulated charge by a monitor light receiving portion (not shown) in the CCD of the light receiving portion FMD, is produced from the terminal ANM, and since the terminal φR is in "low" state at this time, an analog switch AS1 inserted between the terminal ANM and an inverter IN1 connected to the terminal φR and the control circuit COC is in the conducted state, and thus, an output by the monitor light receiving portion is applied to an inverting input terminal of a comparator AC1 whose output is connected to the control circuit COC. The output voltage is gradually lowered as the charge is accumulated. In the above case, if a mode without effecting the flash light emission is selected, a terminal O1 of the micro-computer MCO1 becomes "low", and an analog switch AS3 inserted between a non-inverting input terminal of the comparator AC1 and a constant voltage source E2, and connected through an inverter IN2 to the terminal O1 and another analog switch AS4 is conducted so as to apply the output voltage of the constant voltage source E2 to the non-inverting terminal of the comparator AC1, while on the other hand, if the mode is for effecting the flash light emission, the terminal O1 is in "high" state, and the analog switch AS4 connected between the non-inverting terminal of the comparator AC1 and a constant voltage source E3 is conducted to apply the output voltage of the constant voltage source E3 to said non-inverting terminal of the comparator AC1.

When a monitor output from the terminal ANM reaches the level of the constant voltage source E2 or E3, the output STP1 of the comparator AC1 reverts to "high", and transfer pulses are produced from a terminal φT of the control circuit COC. By the above pulses, the accumulated charges at the charge accumulating portion corresponding to the light receiving amount at each light receiving portion are transferred to the transfer gate, and signals of the accumulated charges are successively fed from a terminal ANS to the control circuit COC. In the control circuit COC, the signals fed from the terminal ANS are sequentially subjected to A-D conversion, and pulses are fed to a terminal ADE upon each completion of one A-D conversion, so that the data subjected to the A-D conversion is produced at an output terminal ADD.

Meanwhile, in the case where no transfer pulses are produced from the terminal φT even after a lapse of a predetermined period of time since the accumulation of the charge is started, this relates to the case where brightness of a target object to be photographed or scene brightness is low. In such a case, pulses are produced from a terminal O2, and upon input of the above pulses, the control circuit COC produces the transfer pulses from the terminal φT irrespective of the output of the comparator AC1.

For emitting a supplementary light by the electronic flash unit, the terminal O1 becomes "high", and the voltage from the constant voltage source E3 is applied to the non-inverting terminal of the comparator AC1. The output potential of the above constant voltage source E3 is adapted to be higher than that of the constant voltage source E2. Accordingly, the transfer pulses φT are to be produced at the time point where the charge accumulating amount by the monitor portion is small as compared with that in the case where no supplementary light emission is effected. The above arrangement is intended to prevent such a disadvantage that, since intensity of the flash light rapidly varies when the supplementary light emission by the flash light is to be effected, the charge accumulating portion is undesirably subjected to overflowing, thus making it impossible to take correct measurements of the light amount distribution.

As described earlier, when the terminal O3 becomes "high" to initiate the charge accumulation, pulses are produced from a one shot circuit OS1 connected between an AND circuit AN1 and the terminal O3 so as to be output through the AND circuit AN1 for being fed to the electronic flash circuit FLC, mentioned in more detail later, via terminals JB1 and JF1 as a light emission starting signal.

In the case where the transfer pulses φT are not produced even after a lapse of the predetermined period of time, pulses are output from the terminal O2 so as to forcibly produce the transfer pulses for suspension of the charge accumulating function. Incidentally, the predetermined period of time in which the charge accumulating time is limited, is set to be short as compared with that in the case where the supplementary light emission is not effected, because the light emitting time of the electronic flash unit is short, without necessity for prolongation of integrating time.

When the micro-computer MCO2 reads data from the electronic flash unit, a signal indicative of whether or not the supplementary light emission is possible is contained in said data. Accordingly, upon receipt of the singal indicating that the supplementary light emission is possible, the micro-computer MCO2 causes its terminal O16 to be "high". The micro-computer MCO1 determines that the functioning in the mode for effecting the supplementary light emission is possible, if its terminal i2 is "high", and also, that such functioning in the mode for effecting the supplementary light emission is impossible when the terminal i2 is "low".

A driving circuit MDR for driving a motor MO for focusing control is coupled to the micro-computer MCO1, and when a result of focusing condition detection is of a front focus, thus requiring retraction of the objective lens, a terminal O4 becomes "high", while, if the result is of a rear focus, with extension of the objective lens being required, another terminal O5 goes "high". The rotation of the motor MO is transmitted to the lens side LE through a lens drive section LD for the focusing control of the objective lens. Meanwhile, the driving amount of the lens drive section LD is converted into pulse signals by an encoder ENC coupled to the micro-computer MCO1 so as to be applied to a clock input terminal CP1 of said micro-computer MCO1 for counting of the driving amount. The pulses from the encoder ENC are also applied to the motor drive circuit MDR, and utilized as a reference signal for driving the motor MO so that the driving speed for the objective lens becomes constant.

A display portion FDP coupled to the microcomputer MCO1 for displaying the state of focusing control is adapted to effect display for front focus state, in-focus state, rear focus state, and focusing control impossible warning according to data from an output terminal OP1 of the micro-computer MCO1.

At the upper right corner of FIG. 3, there is shown a main switch SMB connected between a power source battery BB and the emitter of a transistor BT1 whose base is connected, through an inverter IN6, to a terminal O12 of the micro-computer MCO2. From the above power source battery BB, power is fed directly to the micro-computers MCO1 and MCO2 via the main switch SMB and a power supply line +E. In a line leading from the supply line +E to the AND gate AN3, an inverter IN3 and a resistor is inserted, while a light measuring switch S1 which is to be closed at a first stage of depression of a shutter release button (not shown) is connected between a junction of the inverter IN3 and the resistor and the ground as shown. Upon closure of this switch S1, an interruption signal is applied to the interruption terminal it of the micro-computer MCO2 through the inverter IN3, AND circuit AN3 and OR circuit OR4 and thus the micro-computer MCO2 causes its terminal O12 to be "high" so as to turn on the transistor BT1 through the inverter IN6, and starts feeding the power, through a power supply line +V connected to the collector of the transistor BT1, to circuits other than the inverters IN3 to IN6, AND circuits AN2 and AN3, OR circuit OR4, and micro-computers MCO1 and MCO2. Based on the above starting of the power feeding, reset pulses are produced from a power-on reset circuit PO1 connected between the power line +V and ground, and thus, the circuits to which the power is fed from the power source line +V are reset. Moreover, as the terminal O12 becomes "high", the AND circuit AN3 is rendered to be inoperative, while the AND circuit AN2 becomes operative, and thus, the interruption signal from the switch S1 is not input. In a line leading from the power supply line +E to the AND circuit AN2, the inverter IN4 and a resistor is inserted, and between a junction thereof and the ground, a release switch S2, which is closed at a second stage of depression of the shutter release button, is inserted. Furthermore, in the line leading from the power supply line +E to the AND circuit AN2, the inverter IN5 and a resistor is provided, and between a junction thereof and the ground, a reset switch S4 to be closed upon completion of charging of an exposure control mechanism (not shown) is connected. Accordingly, upon closure of the release switch S2 under the state where the reset switch S4 is closed, with the charging of the exposure control mechanism completed, the interruption signal is applied to the terminal it through the AND circuit AN2 and OR circuit OR4.

A block EDO for producing set exposure control data is coupled to the micro-computer MCO2, and the set data are successively read off through a terminal IP10 based on the read signal from a terminal OP13. A light measuring circuit LMC is also coupled to the micro-computer MCO2, and an output of said light measuring circuit LMC is applied to an analog input terminal AN1 for A-D conversion, while a reference voltage within the light measuring circuit LMC is also applied to a terminal VR1 as a reference voltage for a D-A converter of the micro-computer MCO2. Further connected to the micro-computer MCO2 is a display circuit EXD for displaying exposure control values (i.e., diaphragm aperture values or f numbers, shutter speeds, and the combinations thereof) based on display data from a terminal OP14. An exposure control circuit EXC is also connected to the microcomputer MCO2 for controlling diaphragm aperture values and exposure time based on signals from a terminal OP15. On the other had, a terminal TIE of the exposure control circuit EXC remains in "high" state from the time point of the shutter releasing up to a time point when a predetermined time has elapsed after starting of travelling of a shutter rear blind, thus making it possible to effect integrating function for flash light emitting amount control during the photographing.

A data reading circuit LEB for reading data from a lens side circuit LEC is also coupled to the micro-computer MCO2 and the flash light control circuit FLB to be described later. Upon conduction of the transistor BT1 as described previously, the power is fed from the power supply line +V to the lens side circuit LEC through terminals JB11 and JL1. Thus, when a terminal O15 of the micro-computer MCO2 becomes "high", the data reading circuit LEB is brought into the state capable of functioning, and further, terminals JB12 and JL2 become "high" so as to bring the lens side circuit LEC also into the state capable of functioning. This lens side circuit LEC includes therein a ROM (read only memory) in which data for exposure control and automatic focus control inherent in this interchangeable lens are fixedly stored in a plurality of addresses, clock pulses for inputting the addresses of said ROM through terminals JB13 and JL3, an addressing means for sequentially addressing the addresses of the ROM based on output of a code plate corresponding to a set focal length in the case of a zoom lens, and a parallel/serial converting means which outputs the data parallelly produced from the ROM, sequentially one bit by one bit, through terminals JL4 and JB14 based on the clock pulses received via the terminals JB13 and JL3.

The data fixedly stored in the ROM may include, for example, check data for ensuring mounting of the lens commonly provided in all interchangeable lenses, data for open diaphragm aperture values, data for maximum diaphragm aperture values, data from errors in exposure measurement at open apertures, data for focal lengths, data for variation amounts of diaphragm apertures values corresponding to set focal lengths in zoom lenses, etc. Furthermore, there are included such data as conversion factors KD for converting defocus amounts as detected by a focusing condition detecting device, into driving amounts of the objective lens, data IRD for correcting a deviation in the in-focus position between that detected by near infrared rays and that detected by visible light, with respect to the in-focus position detection through irradiation of near infrared rays so as to prevent dazzling by a person as an object to be photographed during the supplementary light emission by the electronic flash unit, i.e., a difference in defocus amounts (more specifically, the data for correcting the defocus amount as measured by near infrared rays into the defocus amount as measured by visible light), and backlash data BLD which represents an extra driving amount when it is necessary to drive a driving shaft in excess due to a looseness in the fitting between the driving shaft at the camera side and a driven shaft at the side of the objective lens in the case where the driving direction of the lens is changed from one direction to the other direction.

From a terminal SCP of the micro-computer MCO2, respective eight clock pulses are produced, and at the lens side circuit LEC, each time the eight clock pulses are received, the address of the ROM are renewed, and thus, the data fixedly stored in the designated addresses are successively output serially based on the clock pulses so as to be sequentially read from a serial input terminal SIN of the micro-computer MCO2.

In FIG. 3, the circuit FLC within the electronic flash unit to which the present invention is applied is coupled to the micro-computer MCO2 through the electronic flash unit control circuit FLB as referred to earlier.

Figure 4:
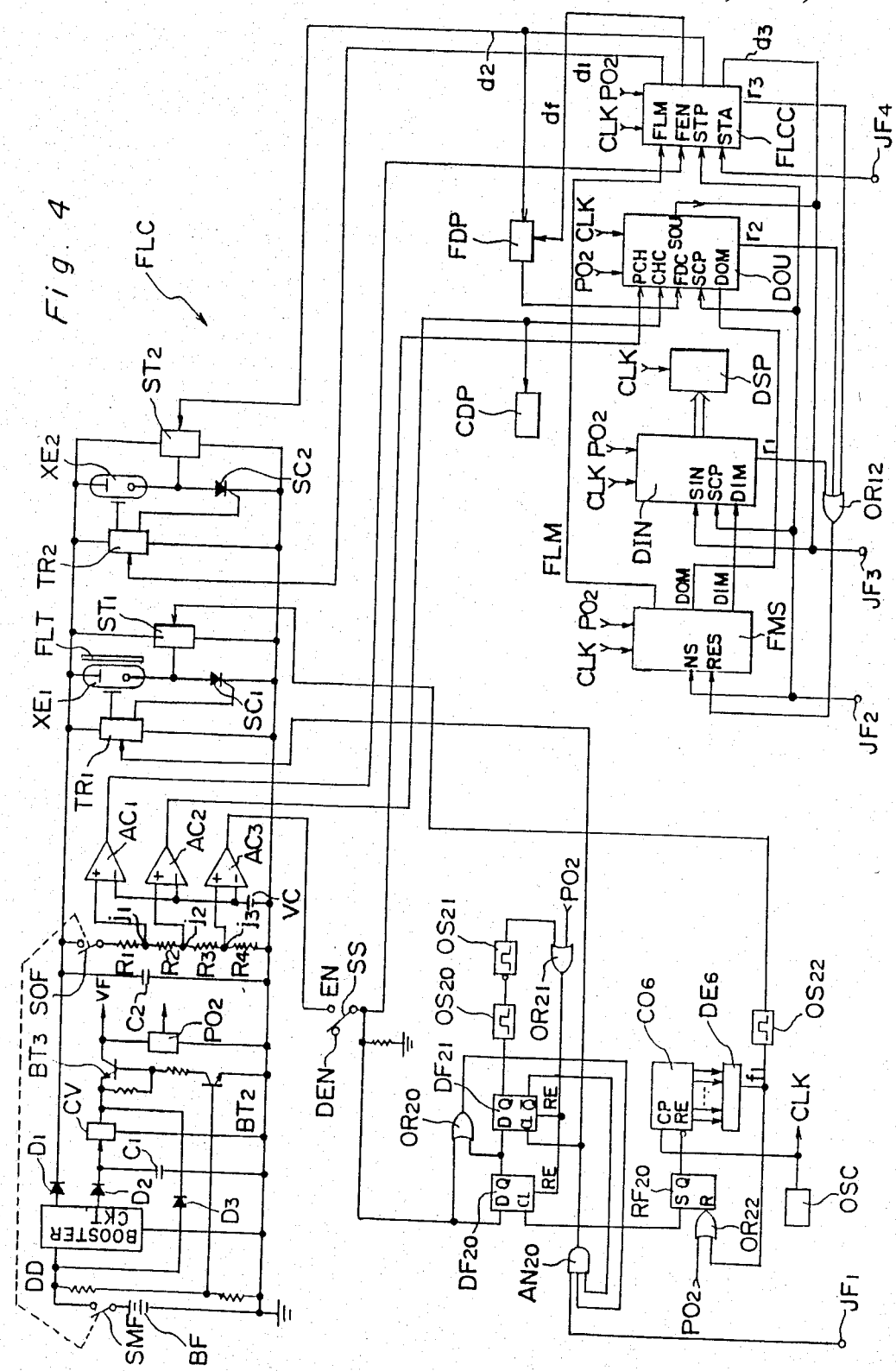
FIG. 4 is a specific electrical circuit diagram of the electronic flash unit employed in the circuit arrangement in FIG. 3, to which the present invention has been applied.

Since one specific embodiment of the above circuit FLC is shown in FIG. 4, the functions with employment of the electronic flash unit of the present invention will be explained hereinbelow also with reference to FIG. 4.

In the circuit FLC of FIG. 4, a main switch SMF for the electronic flash unit is inserted between a booster circuit DD and a power source battery BF, and a high voltage terminal at a secondary winding side of the booster circuit DD is connected to a main capacitor C2 through a diode D1 so that said main capacitor C2 is charged by a voltage from the high voltage terminal. Meanwhile, a low voltage terminal for the secondary winding of the booster circuit DD is connected through a diode D2 to a capacitor C1 which is to be charged by an output voltage from said output voltage, and further to a voltage stabilizing circuit CV, the output side of which is connected to the emitter of a transistor BT3 whose base is connected through a resistor to the collector of another transistor BT2. The base of the transistor BT2 is connected to a junction of a series connection of resistors connected in parallel with the main switch SMF and the power source battery BF, while the emitter thereof is connected to the ground. The collector of the transistor BT3 is connected to a power source line VF, with a power on reset circuit PO2 being inserted between the line VF and the ground. The primary winding side of the booster circuit DD is coupled through a diode D3 to the output side of the voltage stabilizing circuit CV. Upon closure of the main switch SMF, the transistors BT2 and BT3 are turned on, and the booster output from the voltage stabilizing circuit CV or the output of the power source battery BF through the diode D3 is supplied to the power source line VF through the transistor BT3. The power feeding from said power source line VF is effected to all circuits without indication of power feeding passages in FIG. 4. Upon starting of power supply by the power source line VF, reset signal is output from the power on reset circuit PO2, and resetting function of a digital circuit portion is effected. Between the line leading from the diode D1 and the ground, a switch SOF arranged to be opened or closed in the same phase as and in association with the main switch SMF, and a series connection of resistors R1, R2, R3 and R4 for dividing the charging voltage of the main capacitor C2 are connected in series to each other. Junctions j1, j2 and j3 between the resistors R1 and R2, R2 annd R3, and R3 and R4 are respectively connected to non-inverting input terminals of comparators AC1, AC2 and AC3, while inverting input terminals of said comparators are coupled to each other, and connected to the ground through a constant voltage source VC. The output of the comparator AC1 is connected to a terminal FEN of a light emission control circuit FLCC, and the output of the comparator AC2 is connected to a terminal CHC of a data output circuit DOU, while the output terminal of the comparator AC3 is connected to a terminal PCH of the circuit DOU through a manual change-over switch SS to be described later.

When a potential at the junction j1 between the resistors R1 and R2 exceeds the potential of the constant voltage source VC, the output of the comparator AC1 becomes "high", and when this output signals goes "high", the capacitor C2 may be regarded as having been charged up to a minimum voltage necessary for a xenon lamp XE1 (to be described later) to emit light, and upon input of the light emission start signal, a xenon lamp XE2 (to be described later) is started to emit light. When a potential at the junction J2 between the resistors R2 and R3 exceeds the output potential of the constant voltage source VC, the output of the comparator AC2 becomes "high". In this case, it may be regarded that the main capacitor C2 is charged in its voltage, up to a voltage level necessary for the light emitting amount of the xenon lamp XE2 to reach a nominal light emitting amount, and a charge completion signal is fed to the camera main body, while a charge completion display is effected by a display circuit CDP connected to the output of the comparator AC2. Meanwhile, in the case where a potential at the junction j3 between the resistors R3 and R4 exceeds the output potential of the constant voltage source VC, the output of the comparator AC3 becomes "high". In this case, it is indicated that the main capacitor C2 is charged up to a voltage value necessary for the xenon lamp XE2 for the photographing to emit light by the nominal value, and the xenon lamp XE1 for the supplementary light emission to emit light by a predetermined amount two times, and this signal is fed to the camera side as a supplementary light emission possible signal. The switch SS referred to earlier is a switch capable of changing over manually, and when this switch SS is connected to its terminal EN, the supplementary light emission possible signal is fed to the camera side, but if it is connected to its terminal DEN, the input to the terminal PCH becomes "low" at all times, and the supplementary light emission possible signal is not fed to the camera side, and consequently, the camera is not brought into the supplementary light emission mode, while due to the fact that the output of an OR circuit OR 20 connected thereto remains "low", no light emission is effected.

In circuits related to the xenon lamp XE1 for the supplementary light emission and the xenon lamp XE2 for the actual photographing, there are included trigger circuits TR1 and TR2 respectively for the xenon lamps XE1 and XE2 and for conducting thyristors SC1 and SC2 connected thereto, and stop circuits ST1 and ST2 respectively rendering the thyristors SC1 and SC2 non-conductive so as to suspend light emission of the xenon lamps XE1 and XE2. At a light projecting position of the xenon lamp XE1 for the supplementary light emission, there is provided a filter FLT which allows near infrared rays to transmit therethrough, but cuts off visible light with wavelengths shorter than near infrared rays so as to protect a person to be photographed (not particularly shown) against dazzling.

Figure 5A:
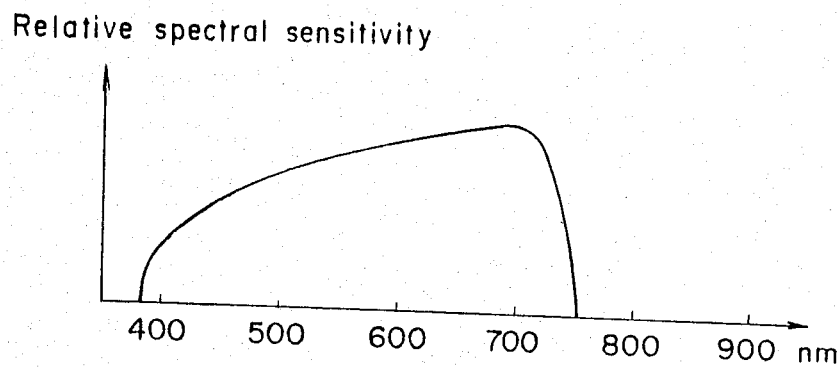
FIG. 5(A) is a graph showing a relative spectral sensitivity of a light receiving portion for a focus detection.
Figure 5B:
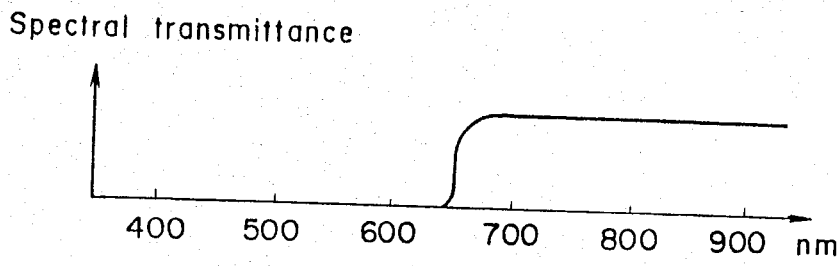
FIG. 5(B) is a graph showing a spectral transmittance of a filter provided at a light projecting position of a light source.
Figure 5C:
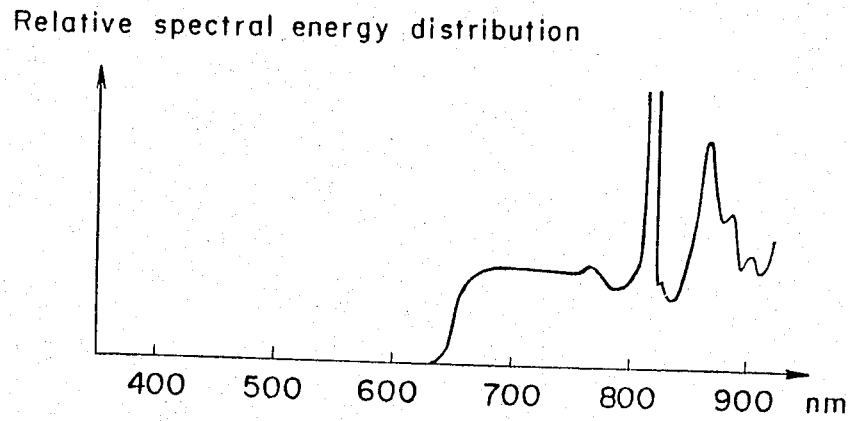
FIG. 5(C) is a graph showing a relative spectral energy distribution of light transmitted through the filter referred to in FIG. 5(B) when a xenon lamp is employed as a light source.

In connection with the above, reference is made to FIG. 5(A) showing a relative spectral sensitivity of the light receiving portion for the focus detection, FIG. 5(B) representing a spectral transmittance of the filter provided at the light projecting position of a light source, and FIG. 5(C) illustrating a relative spectral energy distribution of light transmitted through the filter referred to in FIG. 5(B) when the xenon lamp is employed as a light source.

With respect to the spectral sensitivity of the light receiving portion for the focus detection, the sensitivity should preferably be related only to visible light so as to avoid any influence by the chromatic aberration of the objective lens, so far as the photographing is assumed to be effected under visible light. Incidentally, for the supplementary light emission, it is desirable to employ infrared rays in the region deviated from the visible light region as far as possible so as not to be sensed by a human being. Accordingly, in the technique as a precondition of the present invention, with respect to the focus detection under an ordinary light source, the light receiving portion is provided with a sensitivity up to the wavelengths in the order of 750 nm or thereabout at which the influence by the chromatic aberration may be permissible, while the light emitting portion is arranged to emit light only having wavelengths longer than 650 nm or thereabout so that a person as an object to be photographed does not feel dazzled excessively.

Referring back to FIG. 3, when a terminal O13 of the micro-computer MCO2 assumes "high" state, it becomes possible to supply or receive data between the camera main body and the electronic flash unit. Then, upon production of pulses with a 50 microsecond width from a terminal O14 of the microcomputer MCO2, the pulses are fed to the electronic flash unit FLC through the terminals JB2 and JF2. From the above pulses, a mode judging circuit FMS in FIG. 4 connected to the terminal JF2 judges that the mode is for transferring data from the electronic flash unit to the camera, and makes a terminal DOM "high", and thus, a data output circuit DOU coupled to the circuit FMS and a data input circuit DIN through an OR gate OR12 is brought into an operative state. Thus, when clock pulses are produced from a clock pulse output terminal SCP of the micro-computer MCO2, these clock pulses are applied to a corresponding terminal SCP of the data output circuit DOU in FIG. 4 through the terminals JB2 and JF2, and based on the above clock pulses, a power feeding signal indicating that the power feeding is effected at the electronic flash unit, a signal to a terminal PCH showing that the electronic flash unit is in the state capable of effecting the supplementary light emission, a charge completion signal to a terminal CHC, and a signal to a terminal FDC showing whether or not flash light control function is effected, are successively output from a terminal SOU so as to be fed to the camera side through the terminals JF3 and JB3. Other data to be fed may, for example, include data for the maximum and minimum light emitting amount of the electronic flash unit, data for diaphragm aperture values set at the electronic flash unit, data representing a state of bounce flash, and data showing whether or not multi-flash light is employed, etc. Thus, upon completion of the data transfer, pulses are produced from a terminal d2 of the data output circuit DOU connected to the mode judging circuit FMS via the OR circuit OR12, so that the circuit FMS is brought into the initial state through the OR circuit OR12, and the terminal DOM assumes "low" state.

Subsequently, when pulses with 100 microsecond width are produced from the terminal O14 of the microcomputer MCO2 in FIG. 1, the mode judging circuit FMS causes a terminal DIM to be "high", thus bringing the data input circuit DIN into an active state. Thus, the micro-computer MCO2 of the camera main body produces clock pulses from the terminal SCP, and also outputs data of diaphragm aperture values, exposure time, film sensitivity, and camera-to-object distance, etc. for the flash photographing from a serial output terminal SOU based on the above clock pulses. These data are read into the data input circuit DIN through the terminals JB3 and JF3, and indications based on the read data are displayed by a display circuit DSP.

For starting the exposure control function, pulses of 150 microsecond width are produced from the terminal O14 of the micro-computer MCO2, and then, the mode judging circuit FMS makes the terminal FLM "high", whereby the light emission control circuit FLCC is brought into the active state for effecting the light emission control. Upon completion of travelling of a front shutter blind of a focal plane shutter for the camera, when an X contact SX (FIG. 3) connected between a terminal JB4 and the ground is closed, a light emission starting signal is applied to the terminal STA from the terminals JB4 and JF4, and thus, the light emission starting signal is produced from a terminal d1 of the circuit FLCC. Moreover, simultaneously with the above function, a terminal d3 thereof is reverted from "high" state to "low" state, and this signal is fed to the camera side through the terminals JF3 and JB3. At the camera side, when the terminal JB3 becomes "low", a light measuring integrating circuit (not particularly shown) in the flash light control circuit FLB integrates the amount of light reflected from an object to be photographed illuminated by the flash light and passed through the diaphragm aperture (not particularly shown) of an objective lens, and when the amount of the integration reaches an analog value corresponding to the film sensitivity from an analog output terminal ANO of the micro-computer MCO2, pulses for stopping light emission are produced at the terminal JB2, and applied to a terminal STP of the light emission control circuit FLCC through the terminal JF2. Then, the light emission stopping signal is produced from a terminal d2 and the light emission of the xenon lamp XE2 is suspended. Moreover, the light emission stopping signal from the terminal d2 is also fed to a display circuit FDP, and the X contact SX is opened upon completion of the exposure control function. Based on the above signal, a terminal df assumes "high" state for a predetermined period of time after opening of the X contact SX, and it is indicated that the flash light control function is effected during this period. This signal is further fed also to the camera side via the data output circuit DOU. Meanwhile, upon opening of the X contact SX, pulses are produced from a terminal d3 of the circuit FLCC, and the mode judging circuit FMS is reset through the OR circuit OR12, with the terminal FLM thereof assuming "low" state.

Figure 2:
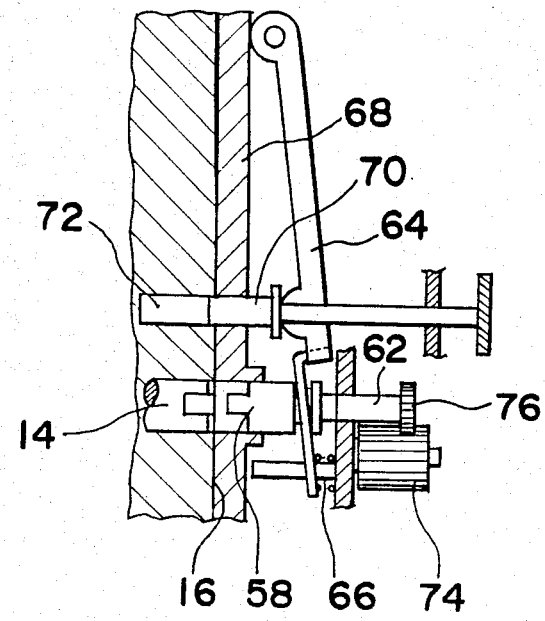
FIG. 2(A) is a side sectional view showing a specific construction of a connecting portion in a transmission mechanism employed in the system of FIG. 1.
FIG. 2(B) is a fragmentary side elevational view showing, on an enlarged scale, connecting members employed in the mechanism of FIG. 2(A)
FIG. 2(C) is a cross section taken along the line II(C)—II(C) in FIG. 2(B)
Figure 2:
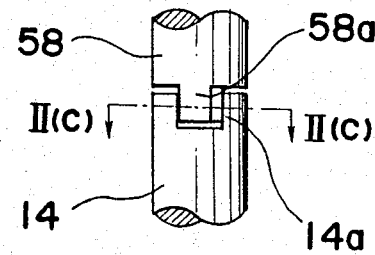
Figure 2:
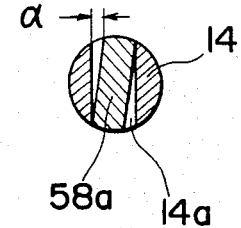

In the supplementary light emitting mode, when "high" signal is produced from the terminal O3 of the microcomputer MCO1 for starting the accumulation, with the terminal O1 thereof in the "high" state, pulses are produced from the one shot circuit OS1 so as to be output from the AND circuit AN1. These pulses are applied to an AND circuit AN20 in FIG. 2 through the terminals JB1 and JF1. In this case, $\overline{Q}$ output of a D flipflop DF21 connected, through a D flipflop DF20, to the output of the AND circuit AN20 becomes "high", with the output of the comparator AC3 assuming "high" state, and the output of an OR circuit OR20 coupled, at its input side, to the flipflops DF20 and DF21, and at its output side, to the AND gate AN20 assumes "high" state. Accordingly, the pulses applied to the AND circuit AN20 are produced from the said AND circuit AN20, and fed to the trigger circuit TR1 to start the supplementary light emission by the xenon lamp XE1. Thus, since the pulses from the AND circuit AN20 set a flipflop RF20, a counter CO6 coupled to the flipflop RF20 is released from a reset state so as to start the counting. Upon lapse of a predetermined period of time after starting of the counting, a terminal f1 of a decoder DE6 coupled to the counter CO6 becomes "high", and pulses are produced from a one shot circuit OS22 connected to said terminal f1. These pulses are fed to the light emission stopping circuit ST1 and the supplementary light emission by the xenon lamp XE1 is suspended. Meanwhile, since the terminal f1 becomes "high", the flipflop RF20 is reset through an OR circuit 22 connected, at its output, to the reset terminal R of the flipflop RF20 and at its input, to the one shot circuit OS22, and thus, the counter CO6 is brought into a reset state, with the terminal f1 assuming "low" state. Moreover, the output pulses of the AND circuit AN20 are also fed to a clock pulse input terminal CL of the D flipflop DF20, so that the "high" output of the comparator AC3 are latched thereby, and thus, Q output of the D flipflop DF20 becomes "high".

Even when the output of the comparator AC3 is in "low" state due to lowering of the charge voltage in the main capacitor C2 when second pulses are produced from the AND circuit AN20, the output of the OR circuit OR20 is in "high" state, since the Q output of the D flipflop DF20 has become "high" at the time point for the first light emission, and thus, pulses are produced from the AND circuit AN20. Therefore, the light emitting function similar to that described earlier is effected by the above pulses. Furthermore, the Q output of the D flipflop DF21 becomes "high" also by the above pulses, and then, a pulse is produced from the one shot circuit OS20 connected to said Q output, and by the negative edge of this pulse, a pulse is produced from the one shot circuit OS21 connected to said one shot circuit OS20 and coupled with the D flipflops DF20 and DF21 through an OR circuit OR21, whereby said D flipflops DF20 and DF21 are reset so as to be brought back into the original state.

Figure 6:
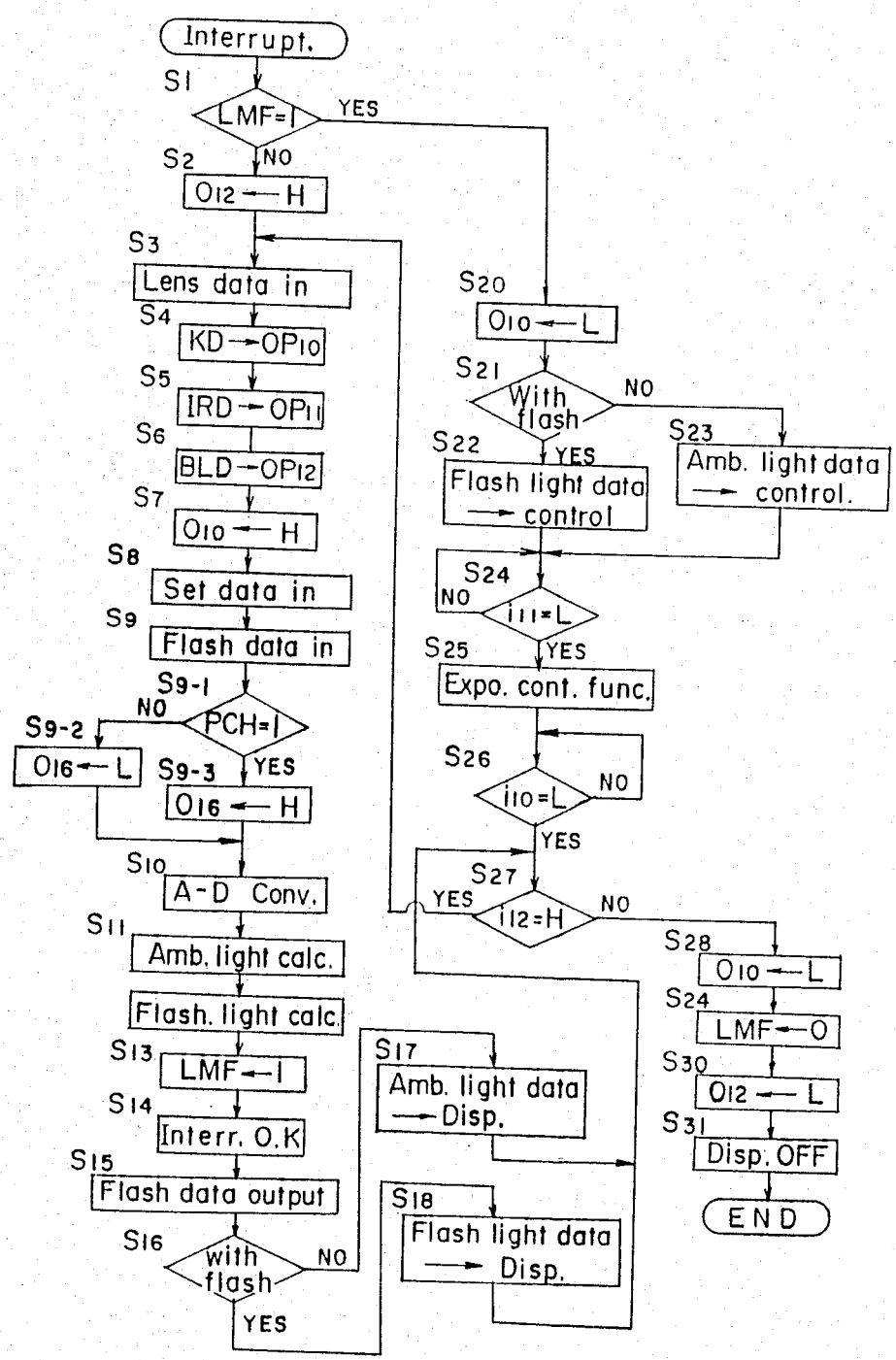
FIG. 6 is a flow-chart showing functionings of a micro-computer MCO2 employed in the circuit of FIG. 1.

Referring to a flow-chart in FIG. 6 representing functionings of the micro-computer in the circuit arrangement in FIG. 3, the operation of the system of FIG. 3 will be described hereinbelow.

Upon closure of the light measuring switch S1, when an interruption signal is applied to the terminal it, the micro-computer MCO2 starts functionings. In the first place, at step S1, judgement is made as to whether or not a flag LMF is "1". This flag LMF is of "1" if the exposure control data has been calculated, but when the light measuring switch S1 is closed for the input of the interruption signal, the calculation is not effected a yet, and therefore, the flag LMF is of "0", with the step proceeding to step S2. At step S2, the terminal O12 is made "high" so as to conduct the transistor BT1 for starting the power feeding through the power source line +V. Subsequently, by effecting the serial input-/output functions a plurality of times for taking in a plurality of data from the lens side circuit (step S3), the conversion factor KD necessary for the automatic focus control is produced at a terminal OP10 (step S4), the correction data IRD of the in-focus position between the near infrared rays and visible light is output at a terminal OP11 (step S5), and backlash data BLD is produced at a terminal OP12 (step S6) so as to be fed to corresponding input terminals IP2, IP3 and IP4 of the micro-computer MCO1 for the automatic focus control, with an output terminal O10 of the micro-computer MCO2 being made "high" (step S7). The above signal is applied to a corresponding interruption terminal it2 of the micro-computer MCO1, and upon output of this signal, the micro-computer MCO1 starts functionings.

At a step S8, the data from the exposure data output block EDO is taken in, and then, the serial input/output function is effected for serially taking in the data from the electronic flash unit (step S9). Thus, if the supplementary light emission possible signal has been input, a terminal O16 of the micro-computer MCO2 is made "high" (step S9-3), while if such a signal has not be input, said terminal O16 is made "low" (step S9-2). Then, the light measuring output from the light measuring circuit LMC is subjected to A-D conversion (step S10). By the foregoing procedures, all the data necessary for the exposure calculation have been taken in.

Subsequently, exposure calculations for the ambient light photographing and flash light photographing are carried out to render the flag LMF "1" for making it possible to effect the interruption (steps S13 and S14). At step S15, the serial input/output function is effected so as to feed data to the electronic flash unit. At step S16, judgement is made as to whether or not the power feeding signal is read from the electronic flash unit, and when the power feeding signal has been read, the flash light photographing data is fed to the display portion EXD, while, if said power feeding signal has not been read, the ambient light photographing data is fed to the display portion EXD, with the step being shifted to step S27. At step S27, it is judged whether or not the terminal i12 connected to the AND circuit AN3 is in "high" state, and if said terminal i12 has become "high", the step is reverted to step S3 to repeat the functions similar to those as described earlier. On the other hand, at step S27, if it is judged that the terminal i12 is in "low" state, the terminal O10 is made "low" to stop the automatic focus control function, and the flag LMF is turned into "0", with the terminal O12 made "low" so as to render the transistor BT1 non-conductive, whereby the power feeding from the power source line +V is suspended for de-energization of the display at the display portion EXD, and thus, the micro-computer MCO2 stops functioning.

Upon input of the interruption signal in the state where the exposure control data are calculated, the step is shifted to step S20 to make the terminal O10 "low" for suspending the automatic focus control function. Then, a decision is made as to whether or not the power feeding signal is applied from the electronic flash device, and if the power feeding signal is being input, the flash light photographing data is fed to the exposure control portion EXC, while on the other hand, if such power feeding signal is not being input, the ambient photographing data is fed to said exposure control portion EXC. Thereafter, at step S24, a check is made as to whether or not the function for the automatic focus control is perfectly stopped and a terminal i11 of the micro-computer MCO2 has become "low", and if the terminal i11 is not in "low" state, waiting is effected until the "low" state is reached, thereby to prevent the undesirable starting of the exposure control function during displacement of the objective lens.

When a terminal i11 becomes "low", the exposure control function by the exposure control circuit EXC is effected, and the micro-computer MCO2 wait until such a time as the set switch S4 is opened, with the exposure control function completed, and the terminal i10 becomes "low". Thus, when the terminal i10 assumes "low" state, it is checked at step S27 whether or not the light measuring switch S1 is closed, and if it has been closed, the step is shifted to step S3 described earlier to repeat the functionings for data taking-in, calculation, and display. On the contrary, when the light measuring switch S1 has not been closed, the step proceeds to step S28 referred to earlier, and the functioning of the micro-computer MCO2 is suspended after the functions similar to those described earlier have been effected.

Figures 1A, 7:
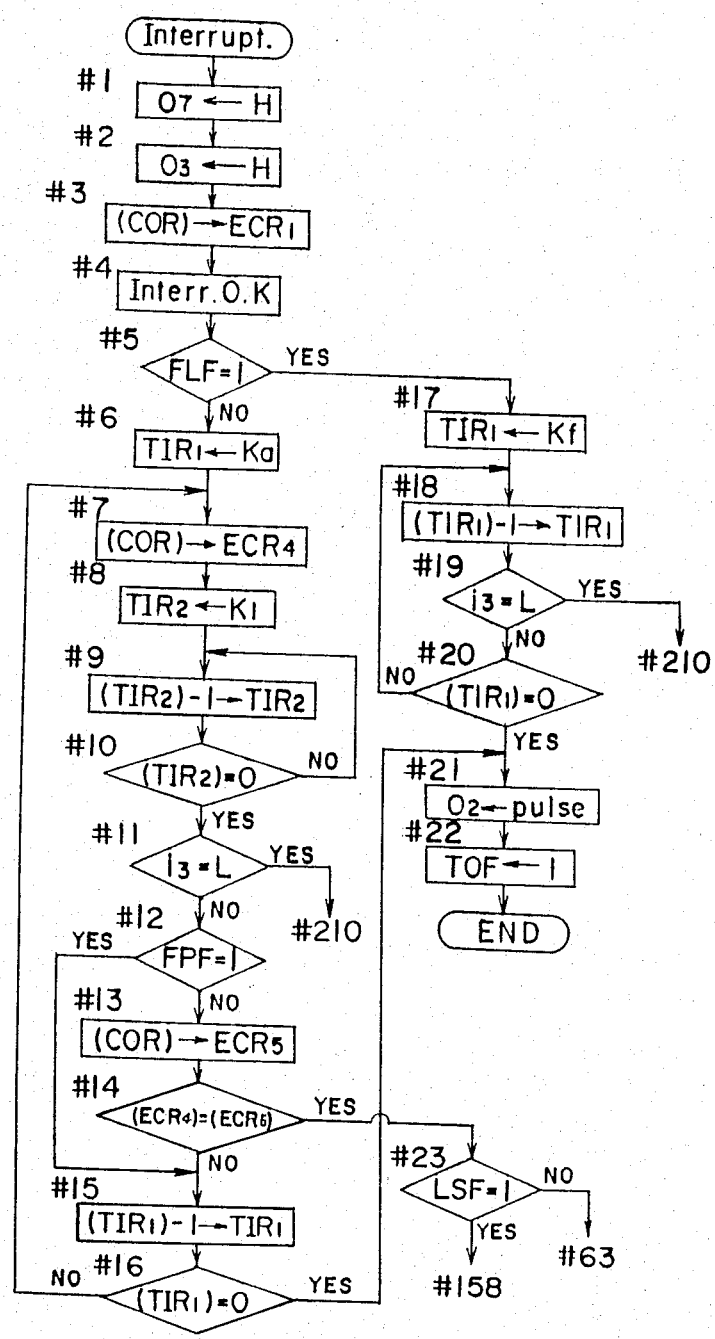
FIGS. 7-1(A) to 7-1(C) to be regarded as continuous in one sheet, FIGS. 7-2(A) to 7-2(C) to be regarded as continuous in one sheet, and FIGS. 7-3(A) to 7-3(C) to be regarded as continuous in one sheet, are flowcharts respectively showing functionings of a micro-computer MCO1 employed in the electrical circuit of FIG. 1.
Figures 1B, 7:
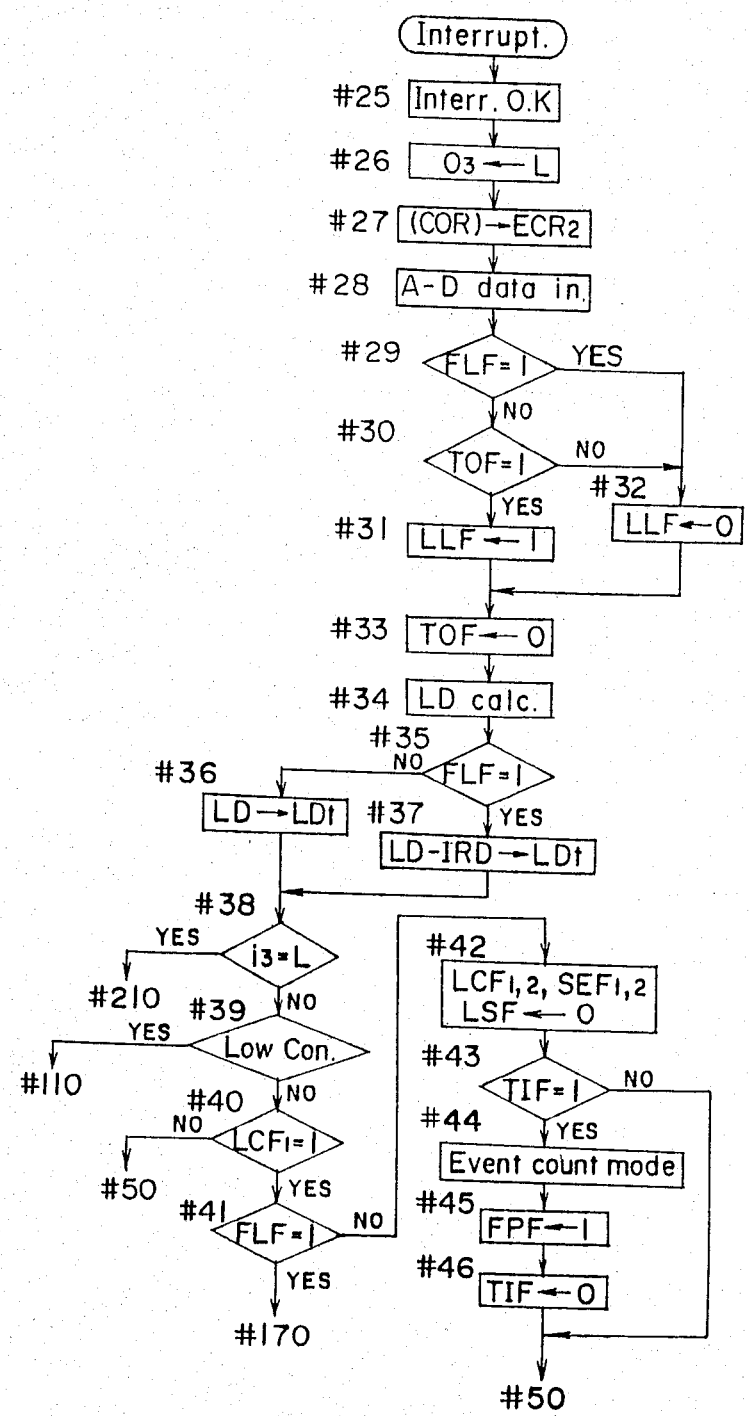
Figures 1C, 7:
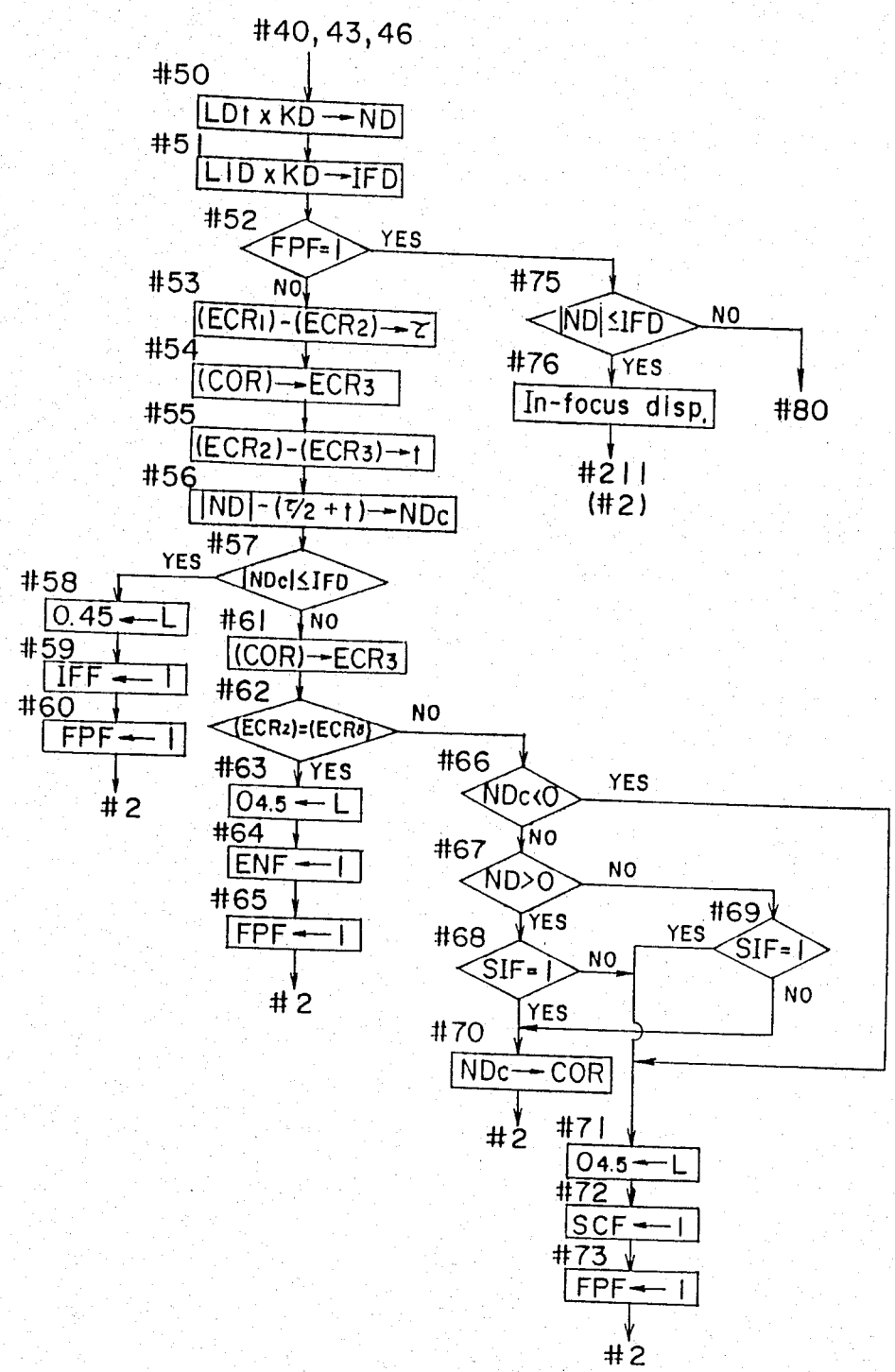
Figures 2A, 7:
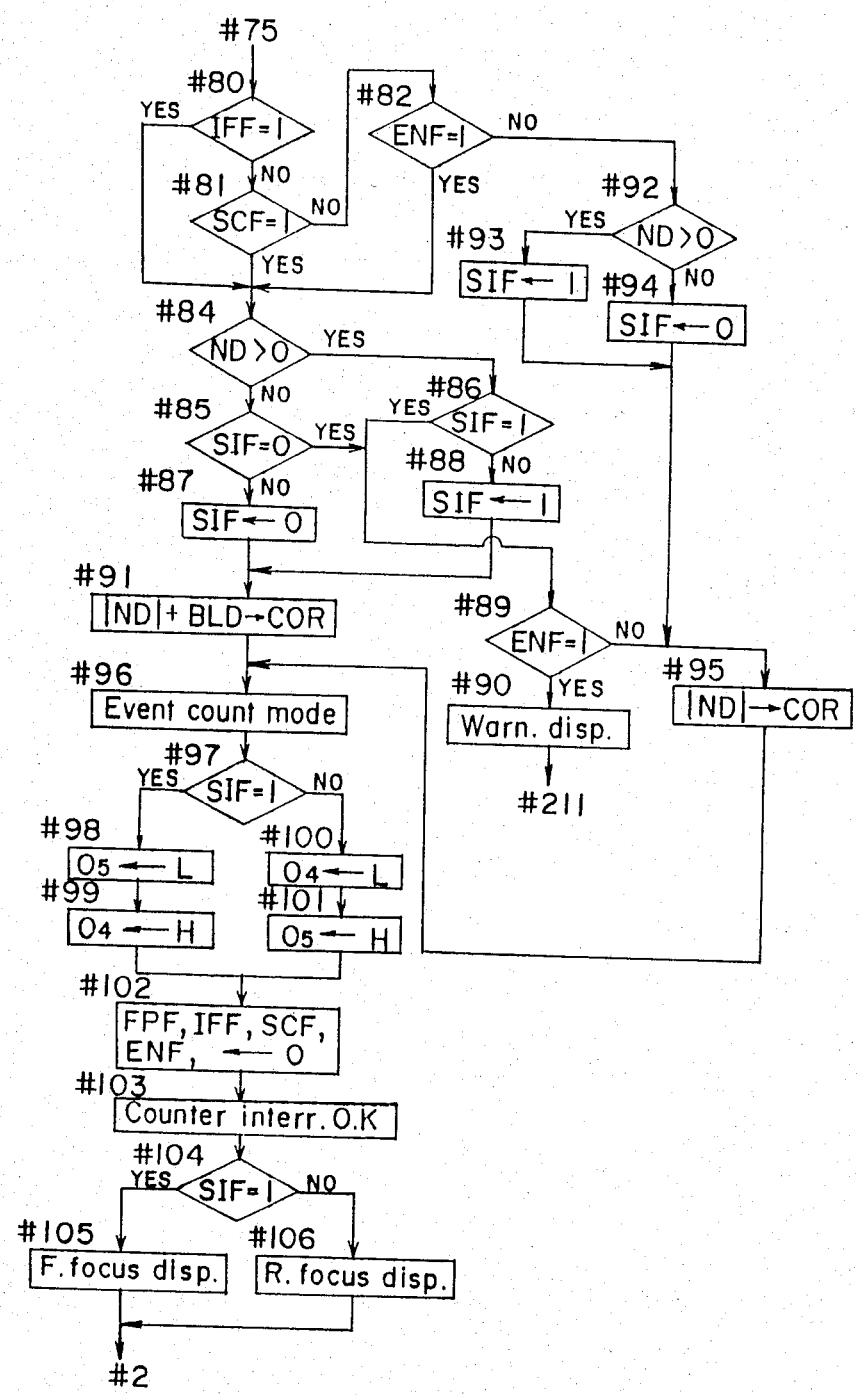
Figures 2B, 7:
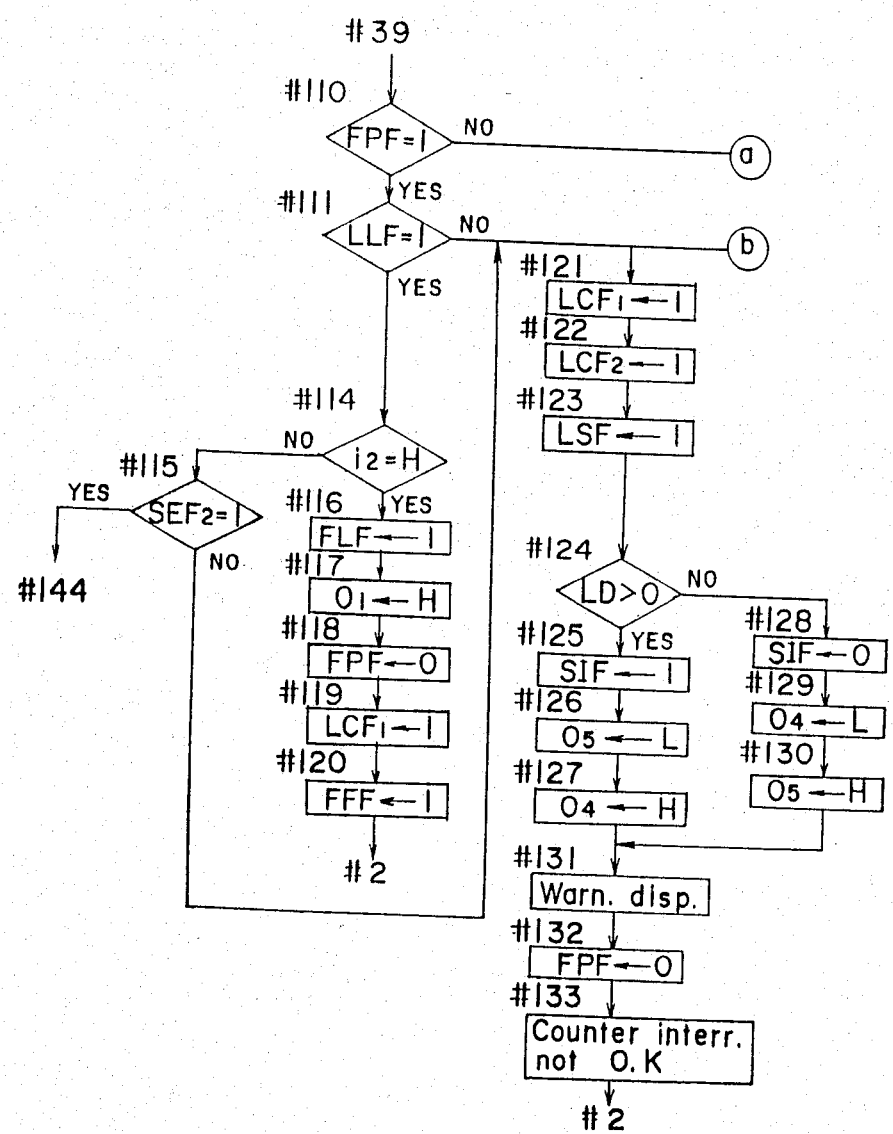
Figures 2C, 7:
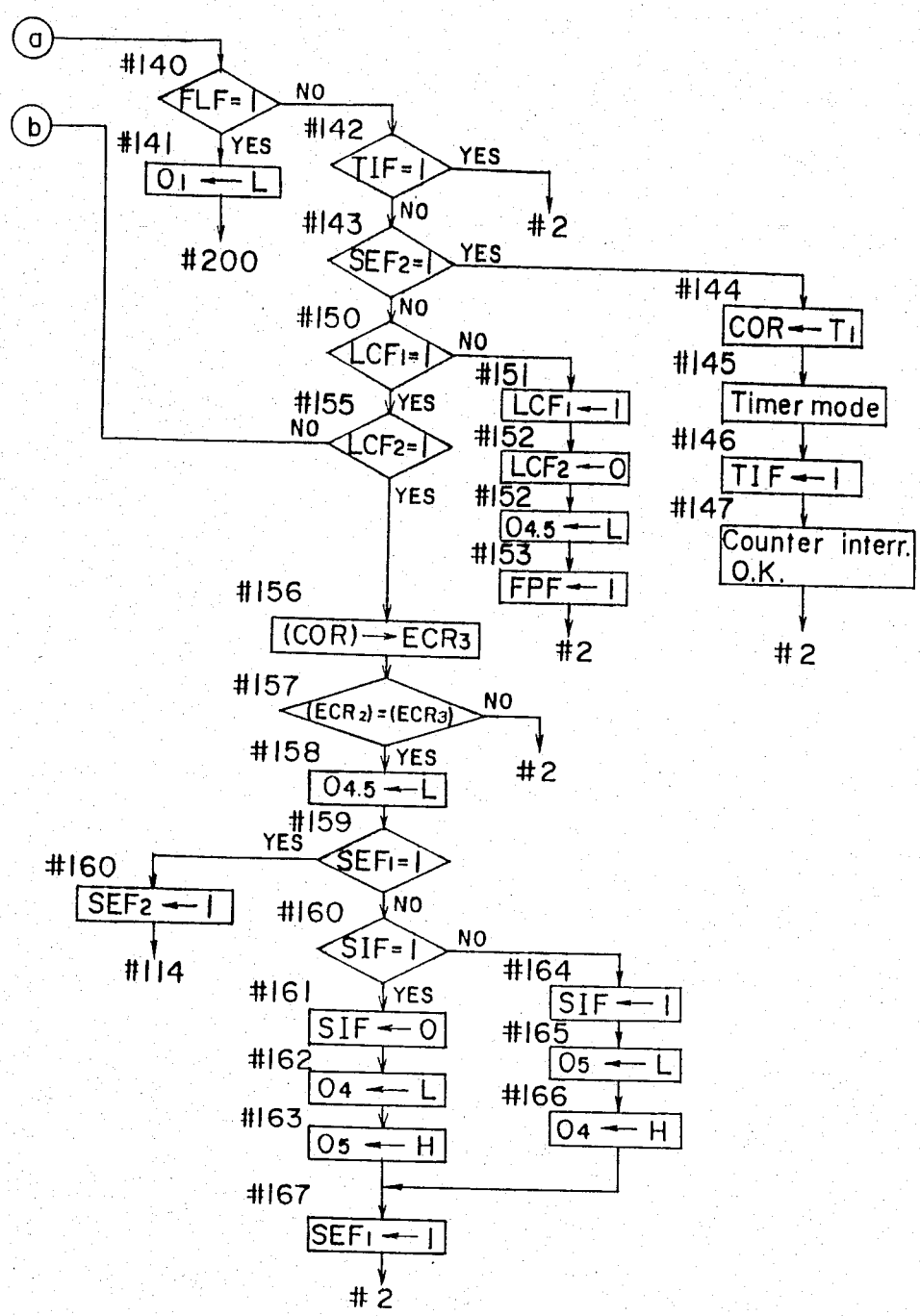
Figures 3A, 7:
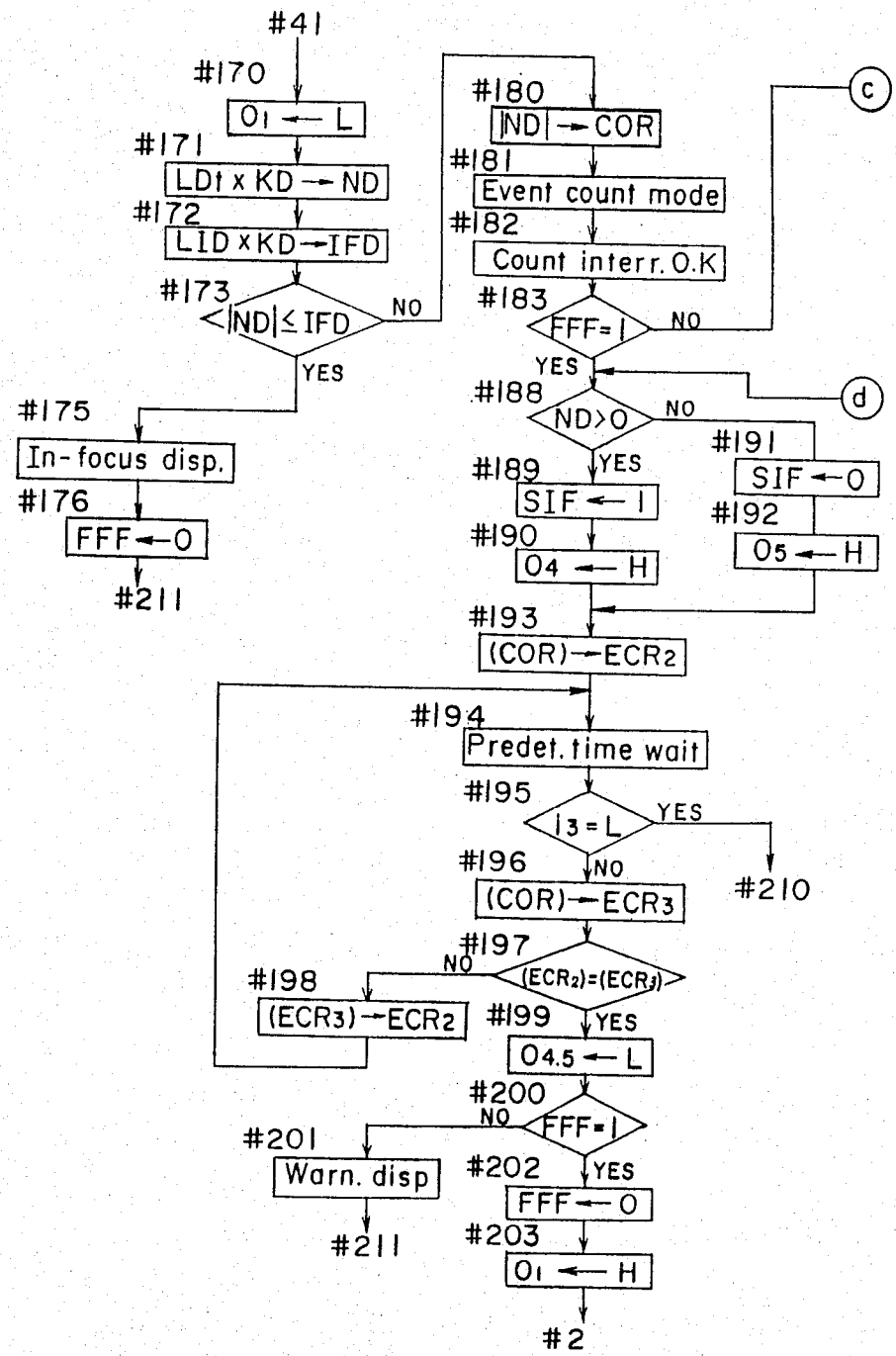
Figures 3B, 7:
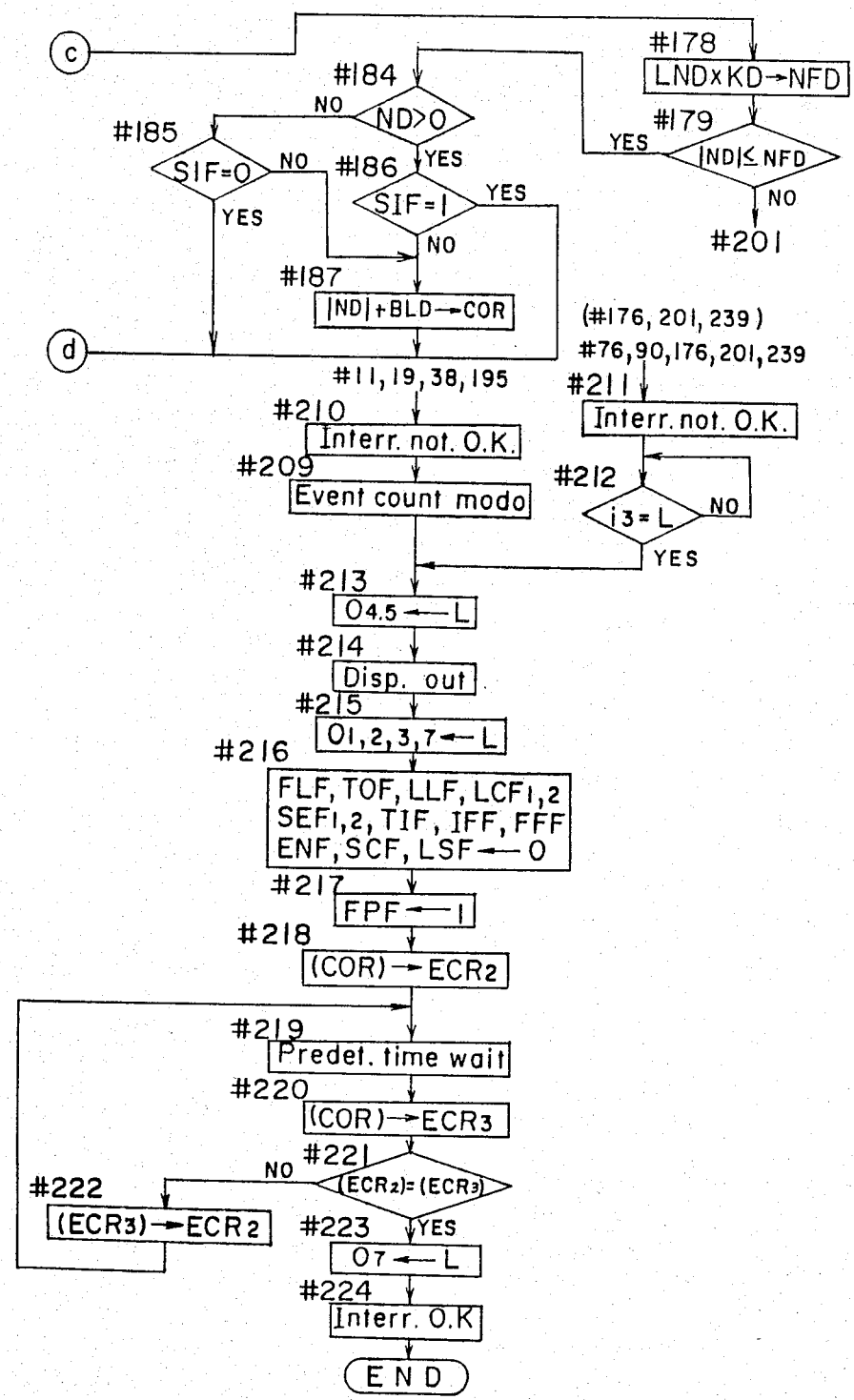
Figures 3C, 7:
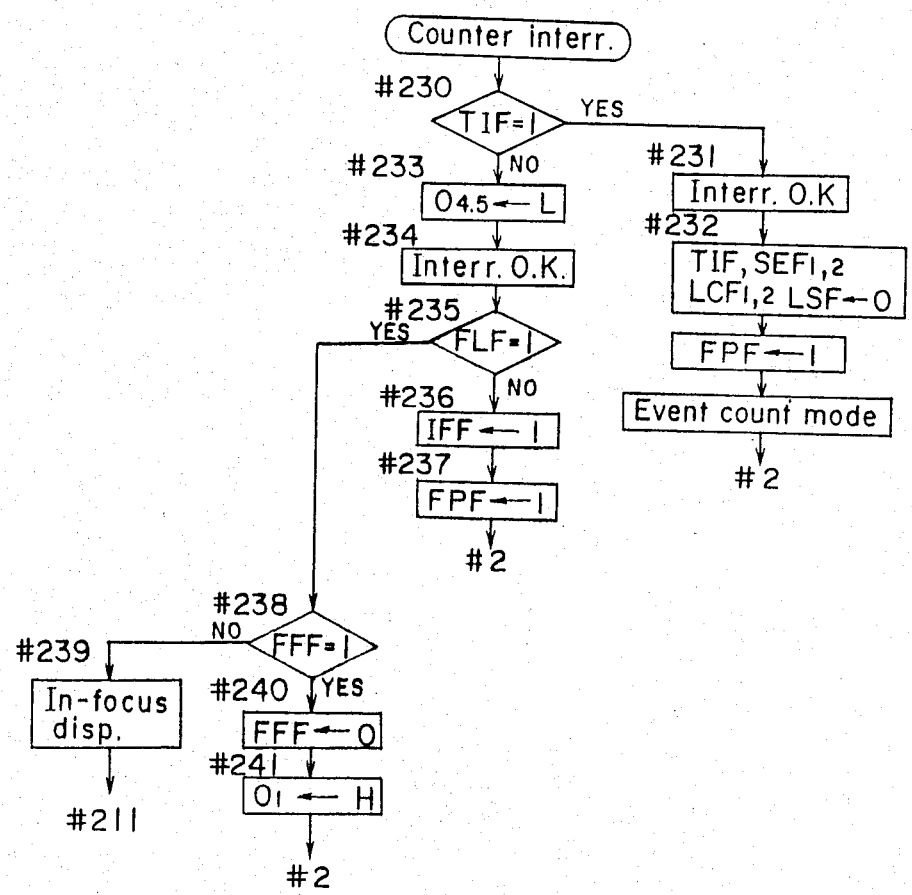

Referring also to the flow-charts of FIGS. 7-1(A) to 7-3(C) showing functionings for the automatic focus control by the micro-computer MCO1, the functions for the automatic focus control of the arrangement in FIG. 3 will be described hereinbelow.

When the terminal O10 of the micro-computer MCO2 becomes "high" for starting the automatic focusing control function, the interruption signal is applied to a terminal it2 so as to start the functioning of the micro-computer MCO1. In the first place, at step #1, a terminal O7 is made "high" so as to transmit to the micro-computer MCO2, the fact that the automatic focus control function is effected, and thus, the terminal O3 is made "high" to start the charge accumulating function by the CCD of the light receiving portion FMD (step #2).

At step #3, contents of a counter (COR) for counting external or internal clocks in the micro-computer MCO1 are assigned to a register (ECR1). These are the data necessary for calculating the displacement of the objective lens during the focus detection, since the focus detection is effected while the objective lens is being moved as described later, and are not required during the first measurement. It should be noted here that the counter (COR) and register (ECR) are those provided in the micro-computer MCO1, and that, in the description to be given hereinafter, parenthesized counters and registers, etc. represent those provided within the micro-computer. At step #4, the interruption is made possible, and the step proceeds to step #5, in which it is judged whether or not the flag FLF is "1". This flag FLF is of "1" when the supplementary light emission by the flash light is effected, and becomes "0" when the measurement only by an ambient light is to be effected. During the first measurement, the supplementary light emission is never effected, with the flag FLF being of "0", and the step is shifted to step #6.

At step #6, a fixed value Ka is assigned to a timer register (TIR1). Subsequently, contents of the counter (COR) are set in a register (ECR4) at step #7, while a fixed value K1 is assigned to a timer register (TIR2) at step #8, and thus, waiting is effected for a predetermined period of time through repetition of such functions that "1" is subtracted from the contents of the timer register (TIR2) at step #9 and a decision is made as to whether or not the contents of said register (TIR2) have become "0" (step #10). Upon lapse of the predetermined period of time, it is checked, at step #11, whether or not an input terminal i3 is in "low" state, and if said terminal i3 is "low", functioning to stop the automatic focus control function to be started from step #210 is effected, since the signal for stopping such automatic focus control function is being applied from the micro-computer MCO2 as described earlier. On the other hand, if the terminal i3 is in "high" state, judgement is made at step #12 as to whether or not a flag FPF is of "1". This flag FPF has become "1" when the motor MO is stationary as in the first measurement. Accordingly, if the flag FPF is "1", with the motor MO stopped, the step is transferred from step #12 to step #15, and by subtracting "1" from the register (TIR1) in which the fixed value Ka is set at step #6, it is judged whether or not the contents of the register TIR1 have become "0", and if the contents are not "0", the step is reverted to step #7 to repeat the similar function. Thus, when the output of the comparator AC1 of FIG. 3 is inverted to "high", while the above function is repeated, transfer pulses are produced from the terminal φT of the control circuit COC, and are applied to an interruption terminal it1 so as to cause the microcomputer MCO1 to start the functionings from step #25.

Meanwhile, when it is judged that the contents of the register (TIR1) have become "0" at step #16, pulses are produced to the terminal O2 at step #21 so as to forcibly suspend the accumulating function as described earlier, and a flag TOF is rendered "1" for termination of the function to wait for the interruption signal to the terminal it1. It should be noted here that the time period for the starting of the accumulating function at step #2 up to the judgement that the contents of the register (TIR1) are "0" at step #16 is set to be a predetermined period of time, and that the accumulating time does not exceed this predetermined period of time.

While the motor MO is being driven, the flag FPF is "0", and the step is shifted from step #12 to step #13, in which the contents of the counter (COR) are assigned to a register (ECR5). Thus, at step #14, comparison is made between the contents of the register (ECR4) to which the contents of the counter (COR) are assigned at step #7 and the contents of the above register (ECR5). A predetermined period of time has elapsed between step #7 and step #13, and if the objective lens has not been moved during the above period, clock pulses are not applied from the encoder ENC, and the relation is such that (ECR4)=(ECR5). Accordingly, even when the motor MO is being driven, the objective lens has reached its terminating end position (i.e., infinite distance position or minimum focusing distance position) so as not to be displaced any further. In the above case, judgement is made on the contents of a flag LSF (which are "0" during the normal focusing function, and "1" when a lens position not low in contrast is being searched upon output of a low contrast signal indicating that a contrast of an object to be photographed is low), and if the contents are "1", it indicates that the searching in the low contrast is under way and the step is shifted to step #158, while when the contents are "0", it shows that the normal focusing function is under way, and the step is transferred to step #63.

At step #5, if the flag FLF is "1", it represents the mode for emission of the supplementary light, and the step is shifted to step #17. In this case, a fixed value Kf is set in the register (TIR1), and by subtracting "1" from the register (TIR1), it is judged whether or not the terminal i3 is "low", and if said terminal i3 is "high", judgement is further made as to whether or not the contents of the register (TIR1) are "0". If said contents are not "0", the function for returning to step #18 is repeated, and when the contents of the register (TIR1) becomes "0" at step #20, the step is shifted to step #21 to effect the function as described earlier. It is to be noted here that in this supplementary light emission mode, the limitation of the accumulating time is made to be very short as compared with the case for the ambient light mode owing to the reasons as described hereinbelow.

For the supplementary light emission, light rays in the near infrared rays are generally employed so that a person as an object to be photographed does not feel dazzled. On the contrary, in the case where the supplementary light emission is not effected, measurement is taken under an ambient light which is generally white. Accordingly, in the case where both light rays are mixed for measurement, it becomes impossible to correct the influence of chromatic aberration with respect to the defocus amount unless the mixing ratio is known. Therefore, during the supplementary light emission mode, the longest accumulating time is arranged to be approximately equal to the light emitting time of the flash light so that the ambient light component may not be measured as far as possible, whereby accurate correction of the chromatic aberration may be effected. Meanwhile, during the supplementary light emission mode, since the motor MO is not driven during the measurement, the terminating end position detecting function for detecting whether or not the objective lens has reached the terminating end, is not effected.

When the transfer pulses are produced from the terminal $\phi T$ of the control circuit COC, with the interruption signal being applied to a terminal it1, functions from step #25 are started. At step #25, the interruption is made possible and the terminal O3 is made "low", and the contents of the counter (COR) are assigned to the register (ECR2). This is a correction data for an error due to displacement of the objective lens when it is moved during the measurement. Subsequently, data obtained by subjecting to A-D conversion, the light receiving amounts of the respective light receiving portions produced from the control circuit COC, are successively taken in, and when the A-D conversion data corresponding to all the light receiving portions have been taken in, the step is shifted to step #29. At step #29, judgement is made as to whether or not the flag FLF is "1", and if it is not "1", a check is made as to whether or not a flag TOF is "1". The flag TOF becomes "1" at step #22 when the accumulation time has reached the limited time. Therefore, when the flag FLF is "0" and the flag TOF is "1", it shows a low brightness in an ambient light mode, and a flag LLF is made "1" at step #31, while in the cases other than the above, the flag LLF is made "0" at step #32, with the flag TOF being made "0" at step #33. At step #34, degree of correlation between the two rows of the light receiving sections is obtained based on the output from the light receiving portion FMD, and from the above correlation degree, the defocus amount and the defocus direction are calculated by an operation proposed, for example, in U.S. Pat. No. 4,333,007. The defocus amount thus calculated is represented by $|LD|$, and it is judged as a front focus if the relation is $LD>0$, and as a rear focus, if the relation is $LD<0$.

At step #35, judgement is made as to whether or not the flag FLF is "1", and when the flag FLF is "0" and the measurement is taken under the ambient light (visible light), the calculated data LD is regarded as a correct value LDt as it is, while on the contrary, if the flag FLF is "1", the mode is for the supplementary light emission, and in this case, since the measurement under near infrared rays is effected, calculation of LD-IRD is made for correction by a difference between the in-focus position under visible light and the in-focus position under near infrared rays, i.e., by the data IRD, and the value thus calculated is regarded as a correct defocus amount LDt. In the present embodiment, for the data IRD, the data fed from the objective lens is arranged to be employed as it is, but the arrangement may be so modified, for example, that with correction data for a specific wavelength being stored in an objective lens, data for a wavelength of a supplementary light emission light source is obtained, and the correction data is converted into data corresponding to the above wavelength, whereby the defocus amount is corrected by the correction data thus converted.

At step #38, judgement is made as to whether or not the terminal i3 is "low", and if it is "low", the step is shifted to step #210, in the similar manner as described earlier. On the other hand, if the terminal i3 is "high", it is further judged whether or not the measured data is of the low contrast. For the judgement of this low contrast, it may be so arranged that the total sum of absolute values of differences in the outputs between the neighboring light receiving sections at the respective light receiving portions of the rows of photosensitive elements is obtained, and if the above total sum is below a predetermined value, the state is judged to be of the low contrast. In connection with the above, in the case of the low contrast, since the defocus amount is calculated by comparing the state of light distribution in the two rows of the light receiving elements, the calculated defocus amount tends to be insufficient in reliability. Therefore, upon judgement of the low contrast, the step is shifted to step #110 to effect the function of the low contrast.

At step #39, if it is found that the state is not of the low contrast, it is judged, at step #40, whether or not a flag LCF1 is "1". If the flag LCF1 is "1", the previously measured value is of the low contrast, and in this case, a decision is made as to whether or not the flag FLF is "1" at step #41. Thus, if the flag FLF is "1", since the supplementary light emission by the flash light is effected by the present measurement, the function from step #170 is effected. Meanwhile, if the flag FLF is "0", this relates to the case where the previous measurement is of the low contrast, and in the present measurement, the contrast has become sufficient, without necessity for effecting the supplementary light emission. In this case, flags LCF1, LCF2, SEF1, SEF2, and LSF are made "0", and by judging whether or not a flag TIF is "1", if it is not "1", the function from step #50 is effected. This relates to the case where the measured value is of the low contrast, and a measured value not of the low contrast is obtained in the course of effecting the measurement by moving the objective lens until such a measured value not of the low contrast can be obtained (referred to as a low contrast searching mode hereinafter), and in the above case, the function is transferred to that from step #50 for displacing the lens based on the defocus amount.

On the other hand, if the flag TIF is "1" at step #43, this relates to the case where the objective lens is searched, over its entire range, by the low contrast search mode, and when a value not of the low contrast could not be obtained during the above period, the measurement is repeated, with the lens remaining stationary for a predetermined period of time (referred to as a low contrast stopping mode hereinafter). In the above case, since the counter (COR) is in a mode (timer mode) to count internal clock pulses of the micro-computer MCO1, the mode is set to be an even count mode (i.e., a mode to count pulses from the encoder ENC), and the flag FPF is made "1", while the flag TIF is made "0" so as to shift the step to that from step #50 for effecting the functions similar to the case where the first measured value is not of the low contrast.

When the flag LCF is "0" at step #40 or when the flag TIF is "0" at step #43 described earlier, or from step #46, the step is transferred to step #50, at which the amount of displacement ND of the objective lens is calculate dthrough multiplication of the defocus amount LDt by the conversion factor KD. Subsequently, at step #51, data LID for a range which may be regarded as an in-focus state, is multiplied by the conversion factor KD so as to compute the amount of displacement IFD of the objective lens in the infocus region. At step #52, judgement is made as to whether or not the flag FPF is "1", and if said flag FPF is "1", the step is shifted to step #75, while on the contrary, if it is "0", the step is shifted to step #53. Accordingly, if the motor MO is being driven, the step is shifted to step #53, while in the case where the motor MO is not being driven, the step is transferred to step #75.

At step #53, by obtaining a difference $\tau$ between the register (ECR1) which has taken in the contents of the counter (COR) at the starting of the charge accumulation of the light receiving portion FMD and the register (ECR2) which has taken in the contents of the counter (COR) at the termination of the charge accumulation, the amount of displacement $\tau$ of the objective lens during the charge accumulation is calculated. By setting the contents of the counter (COR) at this time point in the register (ECR3), a difference t between the register (ECR2) and the register (ECR3) is obtained and the amount of displacement t of the objective lens during the defocus amount calculation is calculated. Thus, on the assumption that the calculated defocus amount is a value based on the measured value at an intermediate portion in the course of displacement of the lens during the accumulation time, it may be regarded that the lens has been displaced by $\tau/2+t$ from the time point when the calculated lens displacement amount ND was measured, and at step #56, calculation of an equation $|ND|-(\tau/2+t)=NDc$ is effected for correction of the amount of displacement. Thereafter, at step #57, the corrected data $|NDc|$ of displacement is compared with data IFD for the infocus region, and if the relation is $|NDc|\leq IFD$, it shows that the in-focus region has been entered. Thus, the step is shifted to step #58, and the terminals 04 and 05 become "low" to stop the motor MO, while the flags IFF and FPF are made "1", with the step being reverted to step #2 so as to effect the measurement for the confirmation.

At step #57, when it is judged that the relation is $|NDc|\geq IFD$, the step is transferred to step #61 to set the contents of the counter (COR) in the register (ECR3) for comparison with the contents of the register (ECR2) in which the contents of the counter (COR) have been set at the time point of step #27. Thus, upon judgement that the relation is (ECR2)=(ECR3), it is regarded that the objective lens has reached its terminating end, and at step #63, the terminals O4 and O5 are made "low" to stop rotation of the motor MO, while the flags ENF and FPF are made "1" to revert to step #2 for effecting the measurement again.

At step #62, upon judgement that the relation is (ECR2)$\neq$(ECR3), it is checked, at step #66, whether or not the corrected data NDc is of a negative value, and if it is of the negative value, it may be regarded that the corrected amount ($\tau/2+t$) is larger than the calculated amount of displacement $|ND|$, thus indicating that the objective lens has passed through the in-focus position. Accordingly, in the above case, the step is shifted to step #71, whereby the terminals O4 and O5 are made "low", with the rotation of the motor MO being suspended, and the flags SCF and FPF are made "1" to revert to step #2 for effecting the measurement for confirmation.

At step #66, upon judgement that the relation is NDc>0, it is subsequently judged, at step #67, whether or not the lens driving direction is in the lens retracting direction (ND>0), and a check is made as to whether or not the flag SIF is "1" at step #68 if ND>0, and at step #69, if ND<0 (lens retracting direction). The above flag SIF has become "1", if the lens moving direction is in the retracting direction at this time point, and it is "0" if the lens moving direction is in the extending direction. Accordingly, if the flag SIF is "0" at step #68, or the flag SIF is "1" at step #69, it may be regarded that the lens moving direction at this time point and the calculated lens moving direction are reversed to each other, and thus, the step is shifted to step #71 described earlier to stop the motor MO, while the flags SCF and FPF are made "1" to revert to step #2 for effecting the measurement for confirmation. On the contrary, if the directions are not reversed to each other as described above, the data NDc calculated at step #56 is assigned to the counter (COR), and the step is returned to step #2 for effecting the next measurement.

At step #52, when the flag FPF is "1", it is the case where the motor is stopped and the measurement is taken without the supplementary light emission. In the above case, judgement is first made as to whether or not the relation is $|ND|\leq IFD$, and if $|ND|\leq IFD$, the in-focus display is effected at step #76, and the step is shifted to step #211 to be described later, with the function being suspended. Meanwhile, if the relation is $|ND|>IFD$, the step is shifted to step #80 in FIG. 7-2(A).

In steps #80 to #82, it is judged whether or not the flags IFF, SCF and ENF have become "1". The above flags are "1" when the moving lens is once stopped and measurement is taken for confirmation as described earlier, and in this case the step is shifted to step #84. At steps #84 to #86, it is judged, in the similar manner as in the previous steps #67 to #69, whether or not the direction in which the lens is driven up to that time is in agreement with the direction as obtained by the present measurement, and if the directions are reversed to each other, the flag SIF is reversed at steps #87 and #88, and at step #91, a value in which the backlash data BLD is added to the data $|ND|$ of the displacement amount, is set in the counter (COR), and the step is shifted to step #96. Meanwhile, when the directions are in agreement with each other, it is judged at step #89 whether or not the flag ENF is "1". If the flag ENF has become "1", this is the case where the lens has arrived at the terminating end as described earlier, and in this case, since the lens can not be driven in the calculated direction, a warning display is effected, while the step is shifted to step #211 to be described later, with the function being suspended. On the other hand, if the flag ENF is "0", the data $|ND|$ of the displacement amount is set in the counter (COR) at step #95, and the step is shifted to step #96.

When the flags ENF, SCF and IFF are all "0", the moving direction is judged at step #92, and if the relation is ND>0, the flag SIF is made "1", while when the relation is ND<0, the flag SIF is made "0", and the data of the displacement amount calculated at step #95 is set in the counter (COR), with the step being shifted to step #96.

In step #96, the event counter mode is selected in which the data set in the counter (COR) is subtracted by the clock pulses applied from the encoder ENC. Subsequently, rotation of the motor MO is started by making the terminal O4 or O5 "high" according to the direction of displacement, while the flags FPF, IFF, SCF and ENF are set for "0", and the display for the front focus or rear focus is effected according to the contents of the flag SIF, with the step being returned to step #2 for effecting the subsequent measuring function.

At step #39, upon judgement that the result of the measurement is of the low contrast, the step is transferred to step #110. At step #110, it is judged whether or not the flag FPF is "1", and if said flag is "1", it is the first measurement, and the step is transferred to step #111. At step #111, judgement is made as to whether or not a flag LLF is "1". As explained with reference to steps #29 through #33, this flag LLF is the flag which has become "1" when the brightness of the object to be photographed is low, and if this flag LLF is "1", the step is shifted to step #114, and if it is "0", the step is transferred to step #121.

At step #114, judgement is made as to whether or not the terminal i2 has become "high", and if said terminal is "low", it is judged, at step #115, whether or not a flag SEF2 is "1". This flag SEF2, to be described in more detail later, is the flag which becomes "1" when the objective lens has been searched by the low contrast searching mode referred to earlier. Accordingly, if said flag SEF2 has become "1", the step is shifted to step #144 for transfer into the low contrast stopping mode to be described later. On the other hand, if the flag SEF2 has become "0", the mode is transferred into the low contrast searching mode from step #121.

At step #114, when it is judged that the terminal i2 is "high", the step is transferred to the supplementary light emission mode from step #116. At step #116, the flag FLF is made "1", and then, the terminal O1 assumes "high" state, while the flag FPF is made "0" and flags LCF1 and FFF are rendered "1", with the step being reverted to step #2, and thus, the measuring function for the supplementary light emission is effected.

In the case where the flag LLF is "0" at step #111 or where the flag SEF2 is "0" at step #115, the procedure proceeds to step #121 to start the low contrast searching mode. In the first place, the flags LCF1, LCF2 and LSF are rendered "1", and subsequently, a decision making is performed to determine the calculated defocus direction, so that the flag SIF is rendered "1" or "0" according to the direction thus determined for moving the objective lens in that direction. Moreover, with the warning display being effected, the flag FPF is made "0", and when the contents of the counter (COR) become "0", the procedure is reverted to step #2 in the state not receiving such interruption signal for effecting the subsequent measurement.

At step #110, if the flag FPF is "0", the step is transferred to step #140 to check whether or not the flag FLF is "1". If said flag FLF is "1", it relates to the case where the result of measurement at the supplementary light emission mode is of the low contrast. In the above case, the terminal O1 becomes "low", and the procedure proceeds to step #200. At step #200, it is checked whether or not the flag FFF is "1". If said flag FFF is "1", it relates to the case where the first measurement is effected in the supplementary light emission mode, and in this case, the flag FFF is made "0", with the terminal O1 assuming "high" state, and the procedure is returned to step #2 to effect the functioning in the second supplementary light emission mode. On the other hand, at step #200, if the flag FFF is "0", it means that the second measurement has been taken in the supplementary light emission mode, and in this case, the warning is displayed, and the procedure is shifted to step #211 for suspending the functioning.

At step #140, if the flag FLF is "0", it is judged subsequently at step #142, whether or not the flag TIF is "1". If said flag TIF is "1", the mode is in the low contrast stopping mode, and the procedure is reverted to step #2 for effecting the subsequent measurement. At step #142, if the flag TIF is "0", it is checked subsequently at step #143 whether or not the flag SEF2 is "1", and if said flag is "1", it relates to the case where only the measured value for the low contrast can be obtained even when the entire region of the objective lens has been searched by the low contrast searching mode, and in this case, the function for the low contrast stopping mode from step #144 is started.

At step #144, fixed data T1 is assigned to the counter (COR) and the mode is changed over into the timer mode in which the contents of the counter (COR) are subtracted by the clock pulses within the micro-computer MCO1, while the flag TIF is rendered "1" to make the counter interruption possible, and the step is reverted to step #2 for effecting the measurement. In the case of this mode, the measurement is repeated under a state where the objective lens is stopped for a predetermined period of time, during which period of time, if a measured value not of the low contrast is obtained, the objective lens is driven by the data of displacement based on said measured value, and when only the measured value of low contrast can be obtained for a predetermined period of time, the same function as in the first measurement is again effected.

At step #143, upon judgement that the flag SEF2 is "0", it is subsequently judged at step #150, whether or not a flag LCF1 is "1". If said flag is not "1", it relates to the case where the measured values up to the last time were not of the low contrast, and the measured value suddenly became that of the low contrast in the present measurement. In this case, the step is shifted to step #151, while the flag LCF1 is rendered "1", the flag LCF2 is made "0", and the terminal O4 is made "low" to stop the functioning of the motor MO, with the flag FPF being made "1" so as to revert to step #2 for effecting the measurement again. If the flag LCF1 is "1" at step #150, it is subsequently judged, at step #155, whether or not the flag LCF2 is "1". If said flag LCF2 is "0", it relates to the case where the last measured value suddenly became low contrast, and the present measured value obtained by re-measurement is also of low contrast. Accordingly, in this case, the function for the earlier described low contrast searching mode from step #121 is started.

At step #155, when a flag LCF2 is "1", the function in the low contrast searching mode is under way. In this case, at step #156, contents of the counter (COR) are assigned to the register (ECR2), and at step #157, it is judged whether or not the contents of the register (ECR3) are in agreement with the contents of the register (ECR2) which has taken in the contents of the counter (COR) at step #27. If they are not in agreement with each other, the objective lens has not reached the terminating end as yet, and therefore, the step is revered to step #2 for effecting the measuring function. On the other hand, when the contents of the register ECR2 and those of the register ECR3 are in agreement, it shows that the objective lens has reached the terminating end, and the driving of the motor MO is suspended at step #158. Then, at step #159, judgement is performed as to whether or not flag SEF1 is "1", and if said flag is "1", it means that the objective lens has reached its one terminating end, and thus, it may be regarded that the objective lens has reached the terminating ends at the opposite side, with the operation thereof over the entire region being effected. Accordingly, in this case, the flag SEF2 is rendered "1", with the step proceeding to step #114 to see if the supplementary light emission is possible from the flash, and if it is possible, the mode is transferred into the supplementary light emission mode, while conversely, if the supplementary light emission is found impossible, the mode is transferred into the low contrast stopping mode.

At step #159, if flag SEF1 is "0", it shows that the objective lens has reached the terminating end for the first time in the low contrast searching mode, and in this case, flag SIF is inverted, with a simultaneous reversing of the rotational direction of the motor MO, and the flag SEF1 is rendered "1" so as to revert to step #2 for effecting the measurement.

At step #41, if the flag FLF is "1", it relates to the case where the result of the measurement taken in the supplementary light emission mode is not of low contrast. In this case, the step is shifted to step #170 in FIG. 5-3(A). At step #170, the terminal O1 is made "low", and from the data LDt for the defocus amount obtained at step #37, data LID for the in-focus region, and the conversion factor KD, the displacement amount ND for the objective lens (#50) and the in-focus region IFD (#51) are calculated. Thus, when the relation $|ND| \leq IFD$ at step #173, the in-focus display is effected, and the flag FFF is rendered "0", with the step being shifted to step #211 for termination of the function.

At step #173, if it is judged that the relation is $|ND| > IFD$, the procedure is transferred to step #180, where $|ND|$ is set in the counter (COR), and the mode is formed into the event count mode so as to make the counter interruption possible. Thus, it is checked whether or not flag FFF is "1", and if said flag is "1", it relates to the case where the first measurement is effected at the supplementary light emission mode, and in this case, the step is transferred as it is to step #188. Meanwhile, if the flag FFF is "0", it relates to the case where the second measurement has been effected. In this case, the step is shifted to step #178, and the data LND in the vicinity of the in-focus point is multiplied by the conversion factor KD to calculate the data NFD in the near region. Subsequently, at step #179, it is checked whether or not the relation is $|ND| \leq NFD$. If the relation is $|ND| > NFD$, it is considered that a normal function is not effected in the first focusing or the second result of measurement lacks in the reliability. Furthermore, it is assumed that the displacement accurately up to the in-focus position only by the movement of the objective lens one time is very difficult, and thus, the focusing function can not be fundamentally effected thereby. Therefore, in the above case, warning is given in step #201, and the step is shifted to step #211 to suspend the function.

At step #179, if the relation is found to be $|ND| \leq NFD$, it is considered that the normal control function is possible, and therefore, the moving direction is subsequently checked to see if the moving direction is reversed from that in the last time. If the moving direction is found to be reversed, calculation for $|ND| + BLD$ is effected so as to correct the data $|ND|$ for the displacement amount by the amount equivalent to the backlash data, and the resultant data is again set in te counter (COR). On the contrary, if the moving direction is not found to be reversed, the step is shifted to step #188, with the data set at step #180 being held as it is. Thus, by judging the moving direction, a signal corresponding to the direction is set in the flag SIF for rotating the motor MO in the judged direction.

Subsequently, after waiting for a predetermined period of time, with the contents of the counter (COR) set in the register (ECR2), it is checked whether or not the terminal i3 has become "low", and the contents of the counter (COR) are set in the register (ECR3) when the terminal i3 is "high". Then, at step #197, it is judged whether or not the contents of the registers (ECR2) and (ECR3) are in agreement with each other. If the relation is (ECR2)≠(ECR3), the contents of (ECR3) are set in (ECR2) and the step is reverted to step #194. Accordingly, during the supplementary light emission mode, when the data is obtained by the measuring, the objective lens is driven by said data, but the measurement function is not effected during such driving. Thus, when the objective lens is moved by the calculated amount of displacement, counter interruption is applied to stop the objective lens as described later, and if it is the first time, the function is transferred to that for the second time, while the in-focus display is effected, with the functioning being suspended, if the function is for the second time. Meanwhile, at step #197, upon detection that the objective lens has reached the terminating end, the terminals O4 and O5 are made "low" and the motor is stopped. Then, it is checked whether or not flag FFF is "1". If said flag FFF is "1", it is the first time measurement, and therefore, flag FFF is made "0" for the terminal O1 to assume "high" state, with the step being returned to step #2 for effecting the measurement in the second supplementary light emission mode. On the other hand, at step #200, when it is found that the flag FFF is "0", this means that the objective lens has reached the terminating end by the second function, and in this case, the warning display is effected to proceed to step #211 for suspending the function.

When the contents of the counter (COR) become "0", the counter interruption is applied, and the function from step #230 is carried out. At step #230, judgement is made as to whether or not the flag TIF is "1", which is related to the case where the predetermined period of time has elapsed in the low contrast stopping mode, and during the period, only the measured value for the low contrast could be obtained. In the above case, the interruption is made possible, with flags TIF, SEF1, SEF2, LCF1, LCF2 and LSF being rendered to be "0" and flag FPF to be "1", and the mode is set for the event counter mode to return to step #2. Accordingly, the measurement is taken under the same state as in the first measurement.

At step #230, if the flag TIF is "0", it relates to the case where the objective lens has been displaced by the calculated amount of displacement. In this case, the motor MO is stopped and the interruption is made possible. Thus, at step #235, it is judged whether or not flag FLF is "1". If said flag FLF is "1", the mode is in the supplementary light emission mode, and the step is shifted to step #238. At said step #238, it is judged whether or not the flag FFF is "1", and if said flag FFF is "0", it means that the second focusing function in the supplementary light emission mode is completed, and thus, after effecting the in-focus display, the step is shifted to step #211 for the termination of the function. On the other hand, if the flag FFF is "1", it shows that the first focusing function in the supplementary light emission is completed, and the flag FFF is rendered "0", with the terminal O1 made "high" so as to return to step #2 for effecting the second focusing function.

At step #235, if the flag FLF is "0", it is related to the case where the measured value not of the low contrast is obtained, without effecting the supplementary light emission, and the objective lens has been displaced by the calculated displacement amount. In the above case, flags IFF and FPF are made "1", with the step being returned to step #2 to effect the measurement for confirmation.

Upon judgement that the terminal i3 becomes "low" at steps #11, #19, #38 and #195, the interruption is made impossible at step #210, and then, the event count mode is selected for transfer to step #213. On the other hand, upon completion of the functionings at steps #76, #90, #175, #201 and #239, the interruption is made impossible at step #211 so as to wait for the terminal i3 to become "low". When said terminal i3 has become "low", the step is shifted to step #213. At said step #213, the terminals O4 and O5 are made "low" to stop the motor MO, with a subsequent de-energization of the display. Then, the terminals O1, O2, O3 and O7 are made "low" to stop the functioning of the circuit for the automatic focus control. Thereafter, "0" is set in all flags except for the flags FPF and SIF, with the flag FPF rendered "1". Subsequently, the contents of the counter (COR) are set in the register (ECR2), and after waiting for a predetermined period of time, the contents of the counter (COR) are set in the register (ECR3). Upon judgement as to whether or not the relation is (ECR2)=(ECR3), if the relation is (ECR2)≠(ECR3), the step is reverted to step #219 after setting the contents of the register (ECR3) in the register (ECR2). Thus, if the relation has become (ECR2)=(ECR3), the objective lens is in the state where its movement is completely stopped, and therefore, the terminal O7 is made "low" to show that the exposure control function may be started at the microcomputer MCO2, and the interruption is made possible, with the micro-computer MCO1 stopping the functioning.

In the foregoing embodiment, it is so arranged that, after detection that the in-focus state is achieved at step #75 when the mode is the ambient light mode, the automatic focus control function is terminated without any further repetition of the functions even if the signal for continuing the automatic focus control function (i.e., the "high" signal to the terminal i3) is being applied from the micro-computer MCO2. But this arrangement may be so modified that the procedure is returned to step #2 in place of #211, as shown in parentheses, after step #76 in FIG. 7-1(C). By this modification, even after the object to be photographed is once brought into the in-focus state, the automatic focus control function is effected again when said object is deviated from the once accomplished in-focus state. Similarly, at step #89 in FIG. 7-2(A), in the case where the flag ENF is "1", i.e., where the objective lens has arrived at the terminal position so as to be unable to move any further, it may also be arranged to return to step #2 for effecting the measurement again. If arranged as described above, the objective lens again starts moving if the signal for the direction in which the objective lens is movable, is obtained. It is also to be noted that even upon modification as described above, the measurements are limited two times in the supplementary light emission mode.

Figure 8:
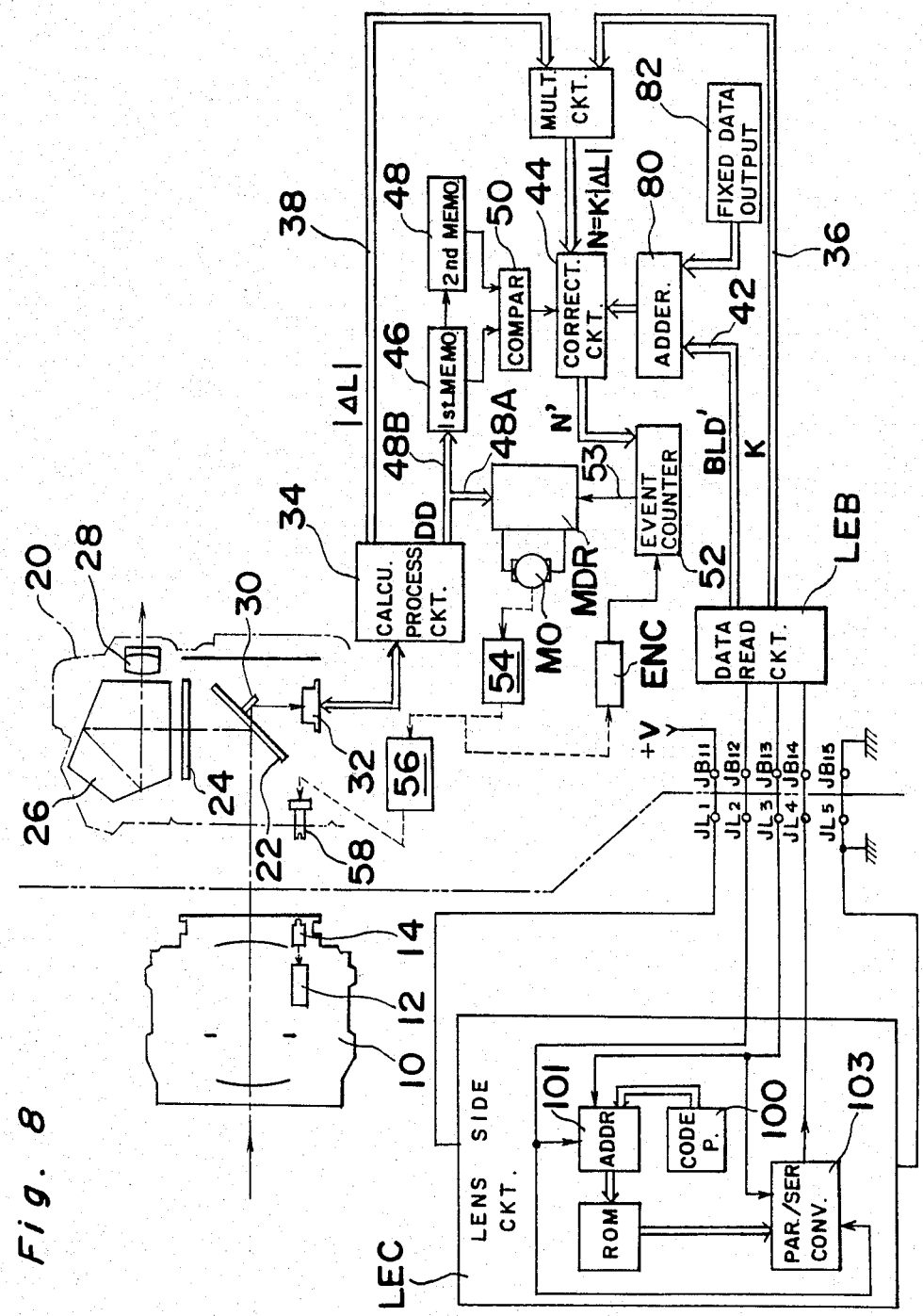
FIG. 8 is a block diagram similar to FIG. 1, which particularly shows a modification thereof.

Referring further to FIG. 8, there is shown a modification of the automatic focus control system of FIG. 1, and in the arrangement of FIG. 8, like parts in FIG. 1 are designated by like reference numerals, with detailed description thereof being abbreviated for brevity.

In the modification of FIG. 8, the data BLD stored in memory circuit is modified and will be referred to as BLD' hereinafter. In connection thereto, in FIG. 8, the signal line 42 from the data reading circuit LEB is connected to an adder 80 which is further coupled to the correction circuit 44, and a fixed data output circuit 82 at the camera side is connected to the adder 80, while other circuit constructions are generally similar to those in FIG. 1.

Subsequently, the modified data BLD' related to the backlash and fixedly stored in the memory circuit ROM of the lens circuit LEC and the backlash on the whole system will be explained hereinbelow.

On the assumption that the backlash amount from the connecting member 14 to a focusing lens within the lens is represented by a symbol BL, the backlash amount due to looseness or play in the coupling between the connecting member 14 of the lens and the connecting member 58 at the camera side is denoted by a symbol BC, and the backlash amount from the motor MO to the connecting member 58 within the camera body is represented by a symbol BB, the backlash amount BT of this system on the whole may be represented by $BT=BL+BC+BB$. Here, it should be noted that only BL depends on the respective objective lens and BC+BB is inherent to the camera body, although the whole backlash amount BT changes in accordance with the interchange of the objective lens. In FIG. 1 embodiment, BT is stored in ROM as BLD. In contrast thereto, in FIG. 8 embodiment, BL is stored in ROM as BLD' and BC+BB is stored in circuit 82 to obtain BT through adder 80. This modification reduces the number of bits for data in ROM.

Incidentally, in order to further reduce the number of bits for data, the following modification is possible in FIG. 8. In this modification, a standard lens with backlash amount BL, which is referred to as BLo, is selected. And, data corresponding to BL-BLo is stored in ROM of each objective lens as BLT'. In other words, BL-BLo means the deviation of backlash in each objective lens from that in the standard objective lens. Accordingly, in the standard lens, BLD' is zero. On the other hand, from the fixed data output circuit 82 at the camera side, the backlash amount BTo=-BoL+BC+BB, which corresponds to the whole backlash with the lens serving as the standard mounted, is produced. Thus, from the adder 80, the backlash amount $BT+BLo+BLD'+BC+BB$ ($=BL+BC+BB$) for the entire system with any interchangeable lens mounted is to be produced.

Meanwhile, in the case where an intermediate member such as a rear converter or the like is inserted between the objective lens 10 and the camera main body 20, an additional backlash is caused by the connection between the objective lens and the intermediate member and the internal mechanism of the intermediate member. In this case, it may be so arranged that a data representing an increase of the backlash amount by the attachment of such an intermediate member is stored in the intermediate member, and such an additional data is added, in the intermediate member, to the data from the objective lens. And the sum of these data is fed from the intermediate member to the camera main body as the backlash data of the combination of the intermediate member and the interchangeable lens mounted on the camera main body. The calculation or addition of data within the intermediate member as described above may be effected, for example, in a manner proposed by the present inventors in Japanese Patent Application (Tokugansho) No. 58-62779.

In the foregoing, although the present invention has been described with reference to preferred embodiments thereof, it is not limited in the application thereof to such embodiments alone, but may further be modified in various ways.

For example, in the foregoing embodiment, on the assumption that the backlash amount differs for the respective interchangeable lens, the backlash correction amount data is memorized for each interchangeable lens so as to be read out at the camera main body side for correcting the motor driving amount data. However, the main cause of the backlash is the play at the engaging portions between the interchangeable lens and the camera main body, and such play may be considered as a constant value irrespective of interchangeable lenses by properly controlling the dimensional accuracy, etc. of parts employed. Accordingly, it may be so arranged that, with scattering in the backlash amount of the transmission mechanism within an interchangeable lens being neglected, a constant correction value equivalent to an amount obtained through addition of a minimum value or average value of the backlash amount of various expected interchangeable lens to a combination of the backlash component (a fixed value) of the transmission mechanism at the camera main body side and the backlash component (a fixed value) resulting from the play between the connecting members, can be utilized as a universal backlash data common to all the interchangeable lenses. And, this constant correction value data is, for example, preliminarily set in the correction circuit 44 in the camera body or adapted to be applied to the correction circuit from a circuit such as 80 in FIG. 8. By the above arrangement, it becomes unnecesssary to store the backlash correction data at each interchangeable lens side and to read such data at the camera main body side, with a consequent simplification of the signal processing.

Moreover, in a system of the above type in which a fixed value common to all the interchangeable lenses is stored in the camera main body as the backlash correction data, it may be so arranged that a signal indicative of presence of the intermediate member is transmitted from the intermediate member to the camera main body in the case of using the intermediate member. And, upon receipt of such a signal, the camera main body simply doubles the fixed value of the backlash correction amount data preliminarily stored in the camera side, so as to use the doubled value as the backlash correction amount data for responding to this case in which the number of connection is two, i.e., the connection between the camera main body and the intermediate member and the connection between the intermediate member and the objective lens.

In the embodiments described so far, although the detection of alternation of driving direction of the driving motor is effected in the electrical circuit, the arrangement may be so modified, for example, that the movement of either one of the mechanical elements in the transmission mechanism or focusing optical system is detected by a switch or the like. Furthermore, although the foregoing embodiments are described with reference to the lens interchangeable type single lens reflex camera, it is needless to say that the present invention may be readily applied to a photographic camera incapable of exchanging lenses, and also, to cameras other than the single lens reflex type.

As is clear from the foregoing description, according to the present invention, in the automatic focus control system which is arranged to drive the focusing optical system of the objective lens by the driving motor through the transmission mechanism based on the signals for the defocus amount and direction automatically detected, the driving amount data of the driving motor is corrected by the backlash amount in the transmission mechanism when the driving direction of the focusing optical system by the driving motor is altered, and therefore, the automatic focus control is effected quickly at a high accuracy, without any adverse effect to the in-focus reaching time and the focusing accuracy due to the backlash.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An automatic focus control system which comprises means for detecting an amount of deviation of a position of an image of a target object to be photographed formed by an objective lens with respect to a predetermined focal plane, a calculating circuit for calculating a driving amount of a focusing control driving motor required for driving a focusing optical system of the objective lens up to an in-focus position based on a result of the detection by said detecting means, a drive control circuit for controlling the driving motor based on data of the driving amount calculated by said calculating circuit, a transmission mechanism for transmitting the driving force of the driving motor to the focusing optical system of the objective lens, an output circuit for producing data of an amount of backlash in said transmission mechanism, a direction detecting circuit for detecting alteration of the driving direction by said driving motor, and a correction circuit for correcting the driving amount data by the backlash amount data of said output circuit in response to the driving direction alteration detecting signal from said direction detecting circuit.

2. An automatic focus control system as claimed in claim 1, wherein said objective lens is an interchangeable lens, said detecting means, said calculating circuit, said driving motor, said direction circuit and said correction circuit being provided in a camera main body, each of said interchangeable lenses being provided with the output circuit for producing backlash amount data inherent in said interchangeable lens.

3. An automatic focus control system as claimed in claim 1, wherein said objective lens is an interchangeable lens, said output circuit being provided in a camera main body so as to produce data corresponding to a total sum of a backlash value due to a play at a connecting portion for connecting the camera side mechanism with the interchangeable lens side mechanism in said transmission mechanism, an approximate interchangeable lens side mechanism backlash value common to all interchangeable lenses, and a backlash value in the camera side mechanism.

4. An interchangeable lens for use in an automatic focus control system, which comprises:

a connecting mechanism which receives a driving force from a driving source provided at the side of a camera main body;

a transmission mechanism for moving a focusing optical system by the driving force received by the connecting mechanism;

means in which data related to backlash of a driving mechanism from the driving provided in the camera main body for driving the focusing optical system to said focusing optical system is fixedly stored;

means for inputting a reading signal from the camera main body; and means for outputting the data related to the backlash stored in said fixed memory means to the camera main body based on the reading signal.

5. An interchangeable lens as claimed in claim 4, wherein the data related to the backlash stored in the fixed memory means is a data of deviation with respect to a data related to backlash of the interchangeable lens serving as a standard.

6. An interchangeable lens as claimed in claim 4, wherein the data related to the backlash stored in said fixed memory means is the data related to the backlash in the transmission mechanism from said connecting mechanism up to the focusing optical system.

7. An interchangeable lens as claimed in claim 6, wherein the data related to the backlash is a data of deviation in the interchangeable lens with respect to the backlash amount in the transmission mechanism from said connecting mechanism to the focusing optical system in the interchangeable lens serving as the standard.

8. An automatic focus control system with a backlash correction arrangement, which comprises means for detecting an amount of deviation of a position of an image of a target object to be photographed formed by an objective lens with respect to a predetermined focal plane, means for calculating a driving amount of a lens driving motor required for driving the objective lens up to an in-focus position based on a result of the detection by said detecting means, means for controlling the driving motor based on data from said calculating means, a first mechanism for transmitting the driving force of the driving motor to the side of the objective lens, a second mechanism for transmitting the driving force from said first transmitting mechanism to a focusing optical system, a first means for outputting data concerning backlash related to the transmission mechanism at the lens side, a second means for outputting data concerning backlash related to the transmission mechanism at the camera main body side, means for outputting backlash data of an entire system based on the data from said first and second output means for the data related to the backlash, means for detecting alteration of the driving direction by the driving motor, and means for correcting the driving amount by the entire system backlash data in response to the detection of the alteration.

9. An automatic focus control system as claimed in claim 8, wherein the data related to the backlash at the lens side is a deviation with respect to the backlash in the transmission mechanism of a lens serving as a standard, and the data of the backlash at the camera main body side is the backlash in the transmission mechanism of the lens serving as the standard, backlash in the transmission mechanism at the camera main body side, and backlash at meshing portions between the transmission mechanism at the camera main body side and the transmission at the lens side.

10. An interchangeable lens unit for use in an automatic focus control system of a camera, which comprises a transmission mechanism for driving a focusing optical system by receiving a driving force from a focusing optical system driving mechanism of the camera main body, a read only memory which fixedly stores therein, in the form of a digital signal, a deviation of the backlash in the transmission mechanism of the present interchangeable lens from the backlash in the transmission mechanism of an interchangeable lens serving as a standard, means for inputting a reading signal from the camera main body, and means for outputting the data of deviation to the camera main body based on said reading signal.

* * * * *